United States Patent
Barnett et al.

(10) Patent No.: US 10,723,254 B2
(45) Date of Patent: Jul. 28, 2020

(54) INSTALLATION TRAILER FOR COILED FLEXIBLE PIPE AND METHOD OF UTILIZING SAME

(71) Applicant: TRINITY BAY EQUIPMENT HOLDINGS, LLC, Houston, TX (US)

(72) Inventors: Alexander Ryan Barnett, Houston, TX (US); Matthew Allen Hegler, Houston, TX (US)

(73) Assignee: Trinity Bay Equipment Holdings, LLC, Houston, TX (US)

( * ) Notice: Subject to any disclaimer, the term of this patent is extended or adjusted under 35 U.S.C. 154(b) by 0 days.

(21) Appl. No.: 16/340,339

(22) PCT Filed: Oct. 9, 2017

(86) PCT No.: PCT/US2017/055772
§ 371 (c)(1),
(2) Date: Apr. 8, 2019

(87) PCT Pub. No.: WO2018/071336
PCT Pub. Date: Apr. 19, 2018

(65) Prior Publication Data
US 2019/0232853 A1     Aug. 1, 2019

Related U.S. Application Data

(60) Provisional application No. 62/406,231, filed on Oct. 10, 2016.

(51) Int. Cl.
*B60P 3/035* (2006.01)
*B60P 1/16* (2006.01)
(Continued)

(52) U.S. Cl.
CPC .............. *B60P 3/035* (2013.01); *B60P 1/025* (2013.01); *B60P 1/162* (2013.01); *B62D 63/061* (2013.01);
(Continued)

(58) Field of Classification Search
CPC ........ B65H 59/06; B65H 75/32; B65H 75/42; B65H 75/425; B65H 49/32; B65H 49/38;
(Continued)

(56) References Cited

U.S. PATENT DOCUMENTS

| 1,839,320 A |   | 1/1932 | Kellems |   |
| 2,905,406 A | * | 9/1959 | Falck-Pedersen | ...... B21C 47/34 242/420.4 |

(Continued)

FOREIGN PATENT DOCUMENTS

| CN | 1209788 | 3/1999 |
| CN | 202906350 | 4/2013 |

(Continued)

OTHER PUBLICATIONS

United States International Searching Authority, International Search Report and Written Opinion dated Dec. 27, 2017 for PCT International Application No. PCT/US2017/055772.
(Continued)

*Primary Examiner* — William A. Rivera
(74) *Attorney, Agent, or Firm* — Greenberg Traurig, LLP; Dwayne Mason; Ira Hatton

(57) ABSTRACT

A system includes a trailer frame, a lifting mechanism coupled to the trailer frame, wherein the lifting mechanism is configured to raise or lower a coil of pipe or a reel of pipe, a braking mechanism configured to apply pressure to the pipe while the pipe is being deployed by the system, and a hydraulic power unit configured to hydraulically power the system.

20 Claims, 24 Drawing Sheets

(51) Int. Cl.
    *B65H 75/32*     (2006.01)
    *B65H 49/32*     (2006.01)
    *B65H 59/06*     (2006.01)
    *B62D 63/06*     (2006.01)
    *B65H 67/02*     (2006.01)
    *B60P 1/02*     (2006.01)

(52) U.S. Cl.
    CPC .............. *B65H 49/32* (2013.01); *B65H 59/06* (2013.01); *B65H 67/02* (2013.01); *B65H 75/32* (2013.01); *B65H 2701/33* (2013.01)

(58) Field of Classification Search
    CPC .......... B60P 1/162; B60P 3/035; B62D 63/06; B62D 63/061; E21B 19/008
    See application file for complete search history.

(56) References Cited

U.S. PATENT DOCUMENTS

| | | | |
|---|---|---|---|
| 3,048,348 A | | 8/1962 | Griffin |
| 3,116,781 A | * | 1/1964 | Woolley .................. E21B 19/22 166/77.2 |
| 3,243,141 A | | 3/1966 | Cook et al. |
| 3,369,823 A | | 2/1968 | Tomen |
| 4,148,445 A | * | 4/1979 | Reynolds ............. B65H 75/425 242/388.7 |
| 4,190,211 A | | 2/1980 | Janzen |
| 4,265,304 A | | 5/1981 | Baugh |
| 4,322,045 A | | 3/1982 | Tellier |
| 4,454,999 A | * | 6/1984 | Woodruff ............... B65H 49/34 242/388.7 |
| 4,538,775 A | | 9/1985 | Deissenberger |
| 4,673,035 A | * | 6/1987 | Gipson ................... E21B 19/22 166/77.1 |
| 4,701,098 A | | 10/1987 | Bills et al. |
| 4,941,798 A | | 7/1990 | Meier |
| 5,807,053 A | | 9/1998 | Pride |
| 5,842,530 A | | 12/1998 | Smith et al. |
| 5,848,641 A | * | 12/1998 | Epp ......................... E21B 19/22 166/77.2 |
| 5,895,197 A | | 4/1999 | McVaugh |
| 6,276,454 B1 | * | 8/2001 | Fontana ................. B65H 75/22 166/343 |
| 6,419,424 B1 | | 7/2002 | Null et al. |
| 6,502,641 B1 | * | 1/2003 | Carriere .................. E21B 7/021 166/384 |
| 7,810,574 B2 | * | 10/2010 | Stukey .................. E21B 43/128 166/384 |
| 7,874,510 B2 | * | 1/2011 | Martin .................... B65B 13/18 242/403 |
| 9,316,067 B1 | | 4/2016 | Lu et al. |
| 9,476,269 B2 | * | 10/2016 | Dyck .................... E21B 19/008 |
| 2011/0182707 A1 | | 7/2011 | Defudes et al. |
| 2012/0061504 A1 | * | 3/2012 | Powell .................. B65H 49/24 242/564 |
| 2013/0121801 A1 | | 5/2013 | Gipson et al. |
| 2014/0086688 A1 | | 3/2014 | Hull et al. |
| 2015/0158692 A1 | | 6/2015 | Reynolds et al. |
| 2015/0292282 A1 | | 10/2015 | Dyck et al. |
| 2015/0315861 A1 | | 11/2015 | Zachariasen et al. |
| 2018/0022261 A1 | | 1/2018 | Weber et al. |
| 2018/0186269 A1 | | 7/2018 | Barnett |
| 2020/0114799 A1 | | 4/2020 | Leger |

FOREIGN PATENT DOCUMENTS

| | | |
|---|---|---|
| CN | 109996749 | 7/2019 |
| EA | 201990872 | 9/2019 |
| EP | 3523233 | 8/2019 |
| GB | 2264923 | 9/1993 |
| WO | 1997/026206 | 7/1997 |
| WO | 2018/071336 | 4/2018 |
| WO | 2020/077201 | 4/2020 |

OTHER PUBLICATIONS

The International Bereau of WIPO; PCT International Preliminary Report on Patentability, issued in connection to PCT/US2017/055772; Apr. 25, 2019; 8 pages; Switzerland.

Pakistan Patent Office; Examination Report, issued in connection to application No. 528/2017; 1 page; Oct. 2019; Pakistan.

United States Patent and Tradeamrk Office; PCT International Search Report, issued in connection to PCT/US219/055823; dated Dec. 19, 2019; 2 pages; US.

United States Patent and Tradeamrk Office; PCT Written Opinion of the International Searching Authority, issued in connection to PCT/US219/055823; dated Dec. 19, 2019; 5 pages; US.

Eurasian Patent Office; Office Action, issued in connection to application No. 201990872/31; Mar. 23, 2020; 5 pages; Russia.

China National Intellectual Property Administration; First Office Action, issued in connection to patent application No. 2017800727836; dated Mar. 2, 2020; China.

European Patent Office; Extended European Search Report, issued in connection to application No. EP17860186.0; dated Apr. 24, 2020; 8 pages; Europe.

* cited by examiner

INSTALLATION TRAILER FOR COILED FLEXIBLE PIPE AND METHOD OF UTILIZING SAME

CROSS-REFERENCE TO RELATED APPLICATIONS

This application claims the benefit, and priority benefit, of U.S. Provisional Application 62/406,231 filed Oct. 10, 2016, the disclosure of which is incorporated by reference herein in its entirety.

BACKGROUND

Flexible pipe is useful in a myriad of environments, including in the oil and gas industry. Flexible pipe may be durable and operational in harsh operating conditions and can accommodate high pressures and temperatures. Flexible pipe may be bundled and arranged into one or more coils to facilitate transporting and using the pipe.

Coils of pipe may be positioned in an "eye to the side" or "eye to the sky" orientation. When the flexible pipe is coiled and is disposed with its interior channel facing upwards, such that the coil is in a horizontal orientation, then the coils of pipe are referred to as being in an "eye to the sky" orientation. If, instead, the flexible pipe is coiled and disposed such that the interior channel is not facing upwards, such that the coil is in an upright or vertical orientation, then the coils of pipe are referred to as being in an "eye to the side" orientation.

The flexible pipe may be transported as coils to various sites for deployment (also referred to as uncoiling or unspooling). Different types of devices and vehicles are currently used for loading and transporting coils of pipe, but usually extra equipment and human manual labor is also involved in the process of loading or unloading such coils for transportation and/or deployment. Such coils of pipe are often quite large and heavy. Accordingly, there exists a need for an improved method and apparatus for loading and unloading coils of pipe.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments of the present disclosure relate to a system that includes a trailer frame, a lifting mechanism coupled to the trailer frame, wherein the lifting mechanism is configured to raise or lower a coil of pipe or a reel of pipe, a braking mechanism configured to apply pressure to the pipe while the pipe is being deployed by the system, and a hydraulic power unit configured to hydraulically power the system.

In another aspect, embodiments of the present disclosure relate to a method that includes providing a trailer having a trailer frame, a lifting mechanism coupled to the trailer frame, a braking mechanism, and a hydraulic power unit configured to hydraulically power the trailer. The method also includes coupling a coil of pipe or a reel of pipe to the lifting mechanism, adjusting a vertical position of the coil of pipe or the reel of pipe via the lifting mechanism, deploying the pipe via rotation of the coil of pipe or the reel of pipe, and applying pressure to the deploying pipe via the braking mechanism.

Other aspects and advantages of the claimed subject matter will be apparent from the following description and the appended claims.

DETAILED DESCRIPTION

Figure 1:
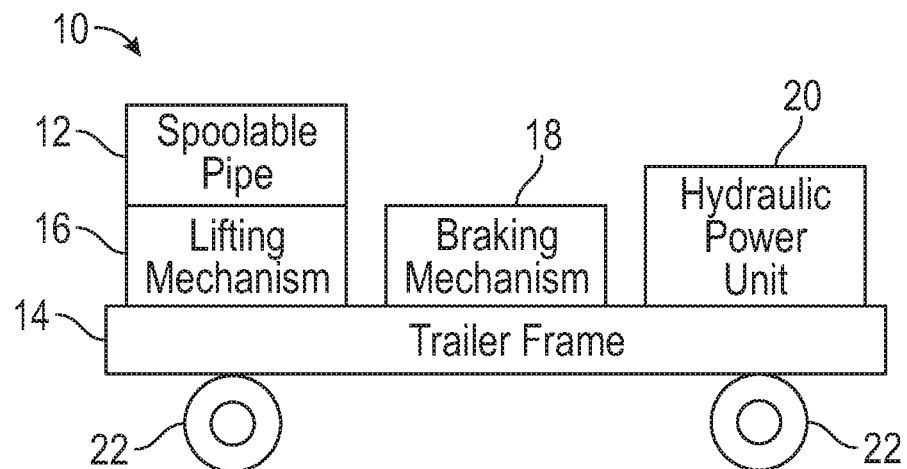
FIG. 1 is a diagram of an installation trailer according to embodiments of the present disclosure.

Embodiments of the present disclosure relate generally to systems used for deploying coils of flexible pipe. The coils of pipe may be self-supported, for example, using bands to hold coils together. The coils of pipe may be self-supported, for example, using bands to hold coils together, or the coils of pipe may be supported around a reel (which may be referred to as a reel of pipe). Deployment systems according to embodiments of the present disclosure may include an installation trailer that includes a trailer frame, a lifting mechanism coupled to the trailer frame that is configured to raise or lower a coil of pipe or a reel of pipe, a braking mechanism configured to apply pressure to the pipe while the pipe is being deployed by the system, and a hydraulic power unit configured to hydraulically power the system.

Embodiments of the present disclosure will be described below with reference to the figures. In one aspect, embodiments disclosed herein relate to embodiments for deploying spoolable pipe from an installation trailer.

As used herein, the term "coupled" or "coupled to" may indicate establishing either a direct or indirect connection, and is not limited to either unless expressly referenced as such. The term "set" may refer to one or more items. Wherever possible, like or identical reference numerals are used in the figures to identify common or the same elements. The figures are not necessarily to scale and certain features and certain views of the figures may be shown exaggerated in scale for purposes of clarification.

FIG. 1 illustrates a block diagram of an embodiment of an installation trailer 10. As described in detail below, the installation trailer 10 may be used to deploy spoolable pipe 12, which may refer to any type of flexible pipe or piping capable of being bent into a coil. The spoolable pipe 12 may be wound on a spool or reel, or the spoolable pipe 12 may be handled as coils without spools or reels. Such reels or coils of spoolable pipe 12 may reduce the amount of space taken up by pipe during manufacturing, shipping, transportation, and deployment compared to rigid pipe that is not capable of being bent into a coil.

Pipe, as understood by those of ordinary skill, may be a tube to convey or transfer any water, gas, oil, or any type of fluid known to those skilled in the art. The spoolable pipe 12 may be made of any type of materials including without limitation plastics, metals, a combination thereof, composites (e.g., fiber reinforced composites), or other materials known in the art. The flexible pipe of the spoolable pipe 12 is used frequently in many applications, including without limitation, both onshore and offshore oil and gas applications. Flexible pipe may include Flexible Composite Pipe (FCP) or Reinforced Thermoplastic Pipe (RTP). A FCP/RTP pipe may itself be generally composed of several layers. In one or more embodiments, a flexible pipe may include a high-density polyethylene ("HDPE") pipe having a reinforcement layer and an HDPE outer cover layer. Thus, flexible pipe may include different layers that may be made of a variety of materials and also may be treated for corrosion resistance. For example, in one or more embodiments, pipe used to make up a coil of pipe may have a corrosion protection shield layer that is disposed over another layer of steel reinforcement. In this steel-reinforced layer, helically wound steel strips may be placed over a liner made of thermoplastic pipe. Flexible pipe may be designed to handle a variety of pressures. Further, flexible pipe may offer unique features and benefits versus steel/carbon steel pipe lines in the area of corrosion resistance, flexibility, installation speed and re-usability.

The installation trailer 10 of FIG. 1 includes a trailer frame 14 that provides a base and support for other components of the installation trailer 10, such as a lifting mechanism 16 coupled to the trailer frame 14. The trailer frame 14 may be constructed of one or more structural components, such as, but not limited to, beams, columns, posts, tubes, sheets, and so forth, coupled to one another via various techniques, such as, but not limited to, bolts, screws, welds, brazing, and so forth. The trailer frame 14 may be made from steel or other metal alloys. The lifting mechanism 16 may be configured to raise or lower a coil of spoolable pipe 12 or a reel of spoolable pipe 12, as described in detail below. The installation trailer 10 may also include a braking mechanism 18 configured to apply pressure (to create back tension) to the spoolable pipe 12 while the spoolable pipe 12 is being deployed by the installation trailer 10, as described in detail below. Finally, the installation trailer 10 may include a hydraulic power unit 20 configured to hydraulically power the installation trailer 10. The hydraulic power unit 20 may be coupled to the trailer frame 14 or disposed on a separate skid in certain embodiments. The installation trailer 10 may include two or more wheels 22 to enable the installation trailer 10 to be moved. The wheels 22 may be tires or continuous tracks to accommodate movement on different types of terrain. Further, certain embodiments may include appropriate wheels 22 to enable the installation trailer 10 be towed along roadways on the wheels 22.

Figure 2:
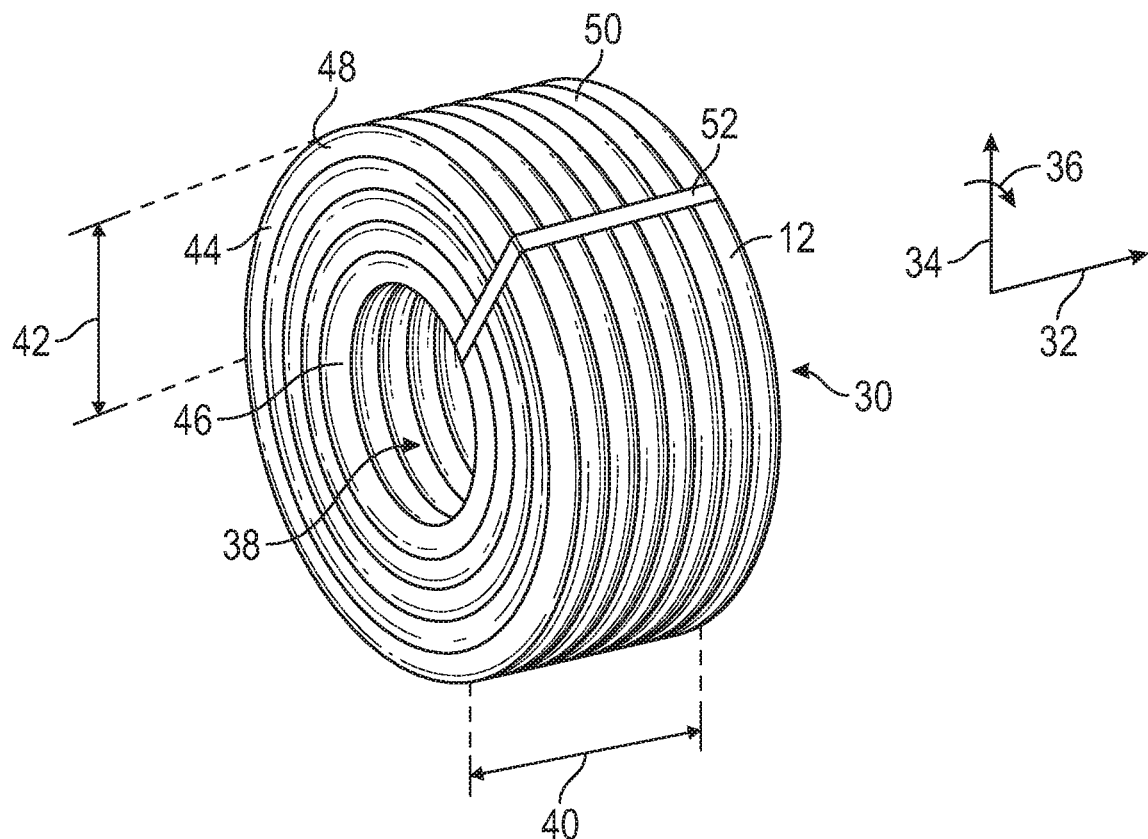
FIG. 2 is a perspective view of a coil of spoolable pipe according to embodiments of the present disclosure.

FIG. 2 illustrates a perspective view of an embodiment of a coil 30 of spoolable pipe 12. The coil 30 may be defined by an axial axis or direction 32, a radial axis or direction 34, and a circumferential axis or direction 36. The coil 30 may be formed by wrapping the spoolable pipe 12 into a coil with an interior channel 38 formed axially 32 therethrough, where the coil 30 may be moved as a single package or bundle of coiled pipe, as shown in FIG. 2. Each complete turn of coiled pipe may be referred to as a wrap of pipe. Multiple wraps of pipe in the coil 30 may be configured in columns along the axial direction 32 of the coil 30 and/or configured in layers along the radial direction 34 of the coil 30. For example, multiple columns of wraps may be formed along the axial direction 32 of the coil 30, where an axial dimension 40 of the coil 30 is based on the diameter of the pipe 12 and the number and axial 32 position of wraps forming the coil 30. Further, multiple layers of wraps may be formed along the radial direction 34 of the coil 30, where a radial dimension 42 of the coil 30 is based on the diameter of the pipe and the number and radial 34 position of the wraps forming the coil 30. In certain embodiments, a weight of the coil 30 may exceed 40,000 pounds (18,144 kilograms). As such, the trailer frame 14 and other components of embodiments of the installation trailer 10 may be configured to handle such coils 30 that other trailers not having the features of the installation trailer 10 cannot. For example, the structural members 80 of embodiments of the installation trailer 10 may be larger or heavier than ones used in other trailers. In one or more embodiments, the coil 30 may be disposed on a reel, which is further discussed below in FIG. 3.

As shown in FIG. 2, the coil 30 of spoolable pipe 12 may be one or more layers (e.g., layers 44 and 46) of pipe packaged or bundled into the coil 30. The coil 30 may include at least one or more layers of pipe that have been coiled into a particular shape or arrangement. As shown in FIG. 2, the coil 30 is coiled into a substantially cylindrical shape having substantially circular bases 48 and 50 formed on each end of the coil 30, where the axial dimension 40 of the coil 30 is measured between the two bases 48 and 50.

As known to those of ordinary skill in the art, the spoolable pipe 12 used to make up the coil 30 shown in FIG. 2 may be coiled using spoolers or other coiler machines suited for such a function. Those of ordinary skill will recognize that the present disclosure is not limited to any particular form of coiler or other device that may be used to form pipe into a coil. Coiling pipe into a coil of pipe, such as 30, assists when transporting pipe, which may be several hundred feet in length in one or more embodiments. Further, the coil 30 may be assembled as a coil to facilitate deployment of the coil. Deployment, as described above and used herein, may refer to the action of unspooling or unwinding the spoolable pipe 12 from the coil 30.

After being assembled into a coil, the coil 30 shown in FIG. 2 may include the interior channel 38 formed axially 32 through the coil 30. The interior channel 38 is a bore disposed generally in the center of the coil 30. The interior channel 38 is substantially circular-shaped. The coil 30 may have an outer diameter (OD) and an inner diameter (ID), where the inner diameter is defined by the interior channel 38. As shown in FIG. 2, one or more bands 52 may be wrapped around the coil 30 to help prevent the coil 30 from unraveling. When the spoolable pipe 12 is deployed, the bands 52 may be cut at one or more desired locations, as described in detail below.

Figure 3:
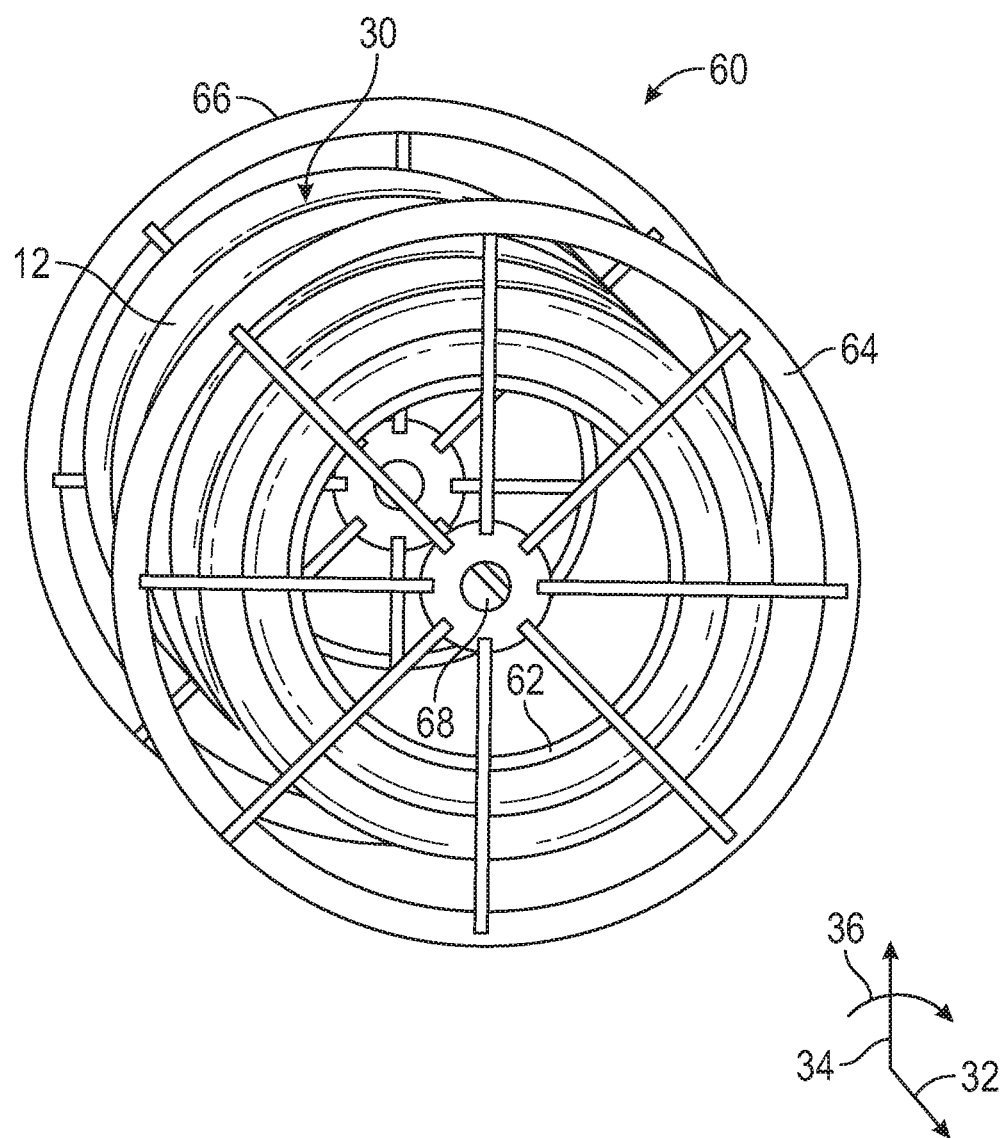
FIG. 3 is a perspective view of a reel of spoolable pipe according to embodiments of the present disclosure.

FIG. 3 illustrates a perspective view of an embodiment of a reel 60 of spoolable pipe 12. In many instances, the coil 30 of spoolable pipe 12 may be wound around the components of the reel 60, instead of transported as a bundled, freestanding package (e.g., as shown in FIG. 2). The coil 30 may be wound around the reel 60 such that the interior channel of the coil 30 is concentric with a central bore of the reel 60. A reel, as understood by those of ordinary skill, may include a cylindrical drum, such as cylindrical drum 62, around which layers of pipe may be wrapped to form the coil 30. The reel 60 may include two substantially circular reel ends 64 and 66 that are capable of turning about a shared axis. Accordingly, the reel ends 64 and 66 may be attached to the cylindrical drum 62.

As shown in FIG. 3, a bore 68 is disposed in each end 64 and 66 at a substantially central position. In addition, the bores 68 for each end 64 and 66 are substantially aligned with each other (and may also be aligned with a central axis of cylindrical drum 62). Spoolable pipe 12 (e.g. flexible pipe) may be wound around the cylindrical drum 62 using any means known to those of ordinary skill in the art.

Figure 4:
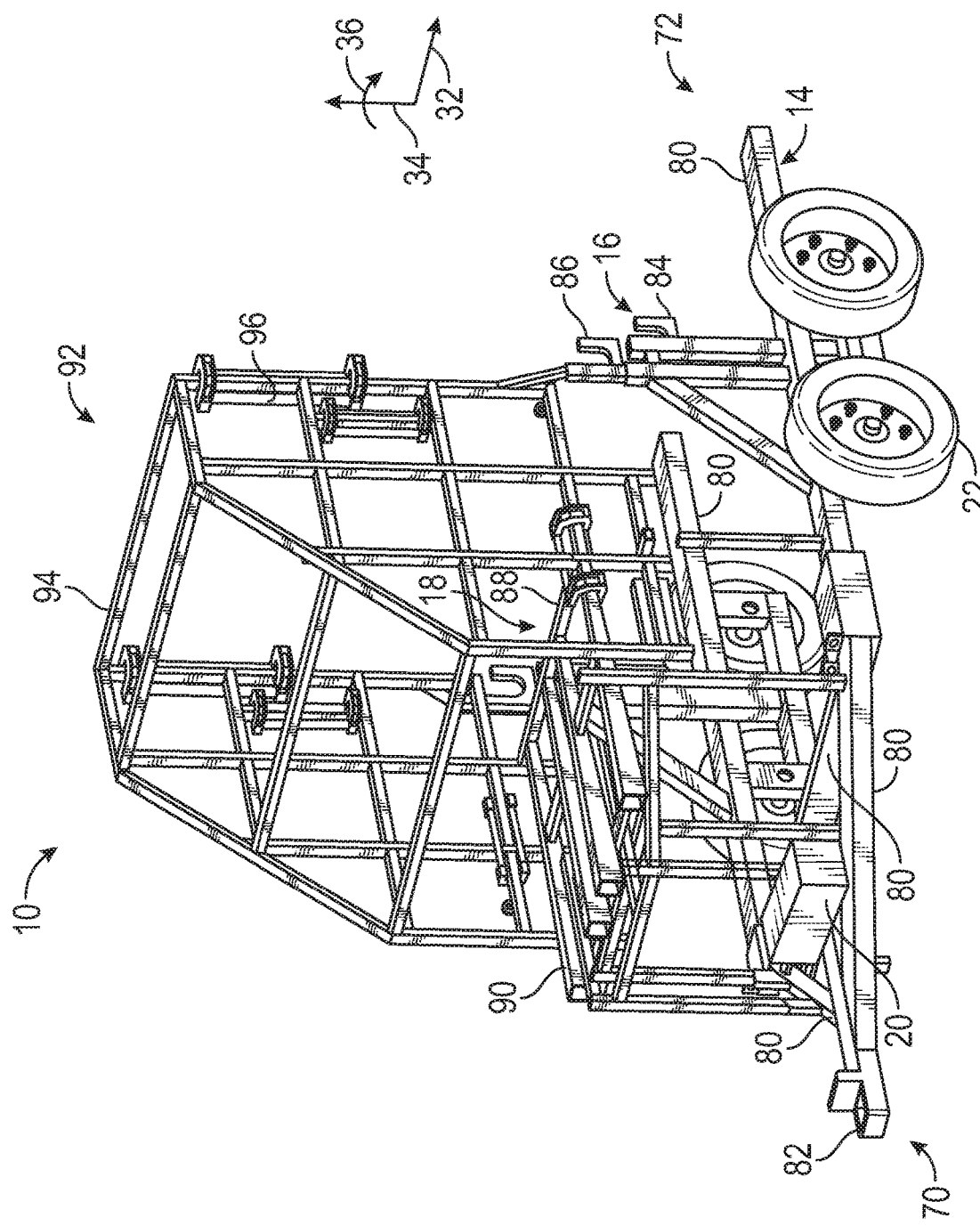
FIG. 4 is a perspective view of an installation trailer according to embodiments of the present disclosure.

FIG. 4 illustrates a perspective view of an embodiment of the installation trailer 10, which may have a front side 70 and a rear side 72. In the illustrated embodiment, the trailer frame 14 is made from several structural members 80 coupled to one another such that the trailer frame 14 may support the other components of the installation trailer 10 and the weight of the coil 30 or reel 60, which may exceed 40,000 pounds (18,144 kilograms). For example, the structural members 80 may be made from square steel tubing or steel I-beams. The trailer frame 14 may include a trailer connection point 82, which may be a hitch, such as a draw bar hitch. A draw bar hitch may be a type of tow hitch that includes a ball extending from a bar and configured to secure a hook or a socket combination for the purpose of towing or being towed. Those of ordinary skill in the art will appreciate that other types of tow hitches and attachment systems may be used to attach another vehicle to the installation trailer 10.

Accordingly, a vehicle (not shown) may be fitted with a connector or attachment system known to those of ordinary skill in the art for connecting to the installation trailer 10. In one or more embodiments, a vehicle used to tow the installation trailer 10 may include without limitation, a dozer, a front-end loader, or excavator, for example, when the installation trailer 10 is fully loaded with the coil 30 or reel 60, or by standard trucks, automobiles, or other vehicles, for example, when the installation trailer 10 is in an unloaded state (i.e. is not carrying the coil 30 or reel 60). The installation trailer 10 may be further designed for off-road use such that the wheels 22 coupled to the trailer frame 14 are also designed for off-road use. In some embodiments, the wheels 22 may be wide base tires (e.g., super single tires) coupled to heavy duty hubs. Thus, the installation trailer 10 may be adapted for use with many types of roads and terrains. In certain embodiments, the installation trailer 10 is capable of deploying the spoolable pipe 12 by means of towing the installation trailer 10 along a pipeline path or keeping the installation trailer 10 stationary and pulling the spoolable pipe 12 off the installation trailer 10.

As shown in FIG. 4, the lifting mechanism 16 may be used to raise and lower coils 30 or reels 60 with the use of two pairs of "j-shaped" hooks. A lower set of hooks 84 can lift coils 30 or reels 60 with a first range of diameters (e.g., between approximately 12 to 13.5 feet) and an upper set of hooks 86 can lift coils 30 or reels 60 with a second range of diameters (e.g., between approximately 13.6 to 16 feet) that is greater than the first range. The two sets of lifting hooks 84 and 86 may be mechanically connected to one another and may be raised and lowered by use of hydraulic cylinders capable of lifting or lowering coils 30 or reels 60 that may exceed 40,000 pounds (18,144 kilograms).

In the illustrated embodiment, the braking mechanism 18 may be configured as a pipe brake that applies pressure to the spoolable pipe 12 perpendicular to the helical wrapping of the spoolable pipe 12. For example, the braking mechanism 18 may include a pipe-contacting component 88 coupled to support components 90. The pipe-contacting components 88 may be a solid or hollow beam, pipe, tube, or column. In certain embodiments, the pipe-contacting component 88 may be in two parts to help maintain contact with the spoolable pipe 12 as each layer is being deployed, as described in detail below.

In the illustrated embodiment, the hydraulic power unit 20 may be coupled to the trailer frame 14 near the trailer connection point 82. For example, the hydraulic power unit 20 may include an electric-start gasoline or diesel engine, 2-stage hydraulic pump, hydraulic fluid reservoir, and gasoline reservoir configured to provide hydraulic power to the hydraulic components of the installation trailer 10, such as the hydraulic cylinders of the lifting mechanism 14 or other hydraulic cylinders described below.

As shown in FIG. 4, the installation trailer 10 may include a coil containment cage 92 that may be made from several structural members 94 coupled to one another. For example, the structural members 94 may be made from square steel tubing. As described in detail below, the coil containment cage 92 may be used to block undesired movement of coils 30 of spoolable pipe 12, such as movement in the axial 32 direction outside the coil containment cage 92. In other words, the coil containment cage 92 provides side containment of the coils 30. Since the circular reel ends 64 and 66 of the reel 60 provide a similar function, the coil containment cage 92 may be omitted when the installation trailer 10 is used for deploying reels 60. In certain embodiments, one or more rollers 96 may be coupled to the coil containment cage 92 to reduce friction or possible damage to the outer surface of the spoolable pipe 12 when the spoolable pipe 12 contacts the coil containment cage 92.

Figure 5:
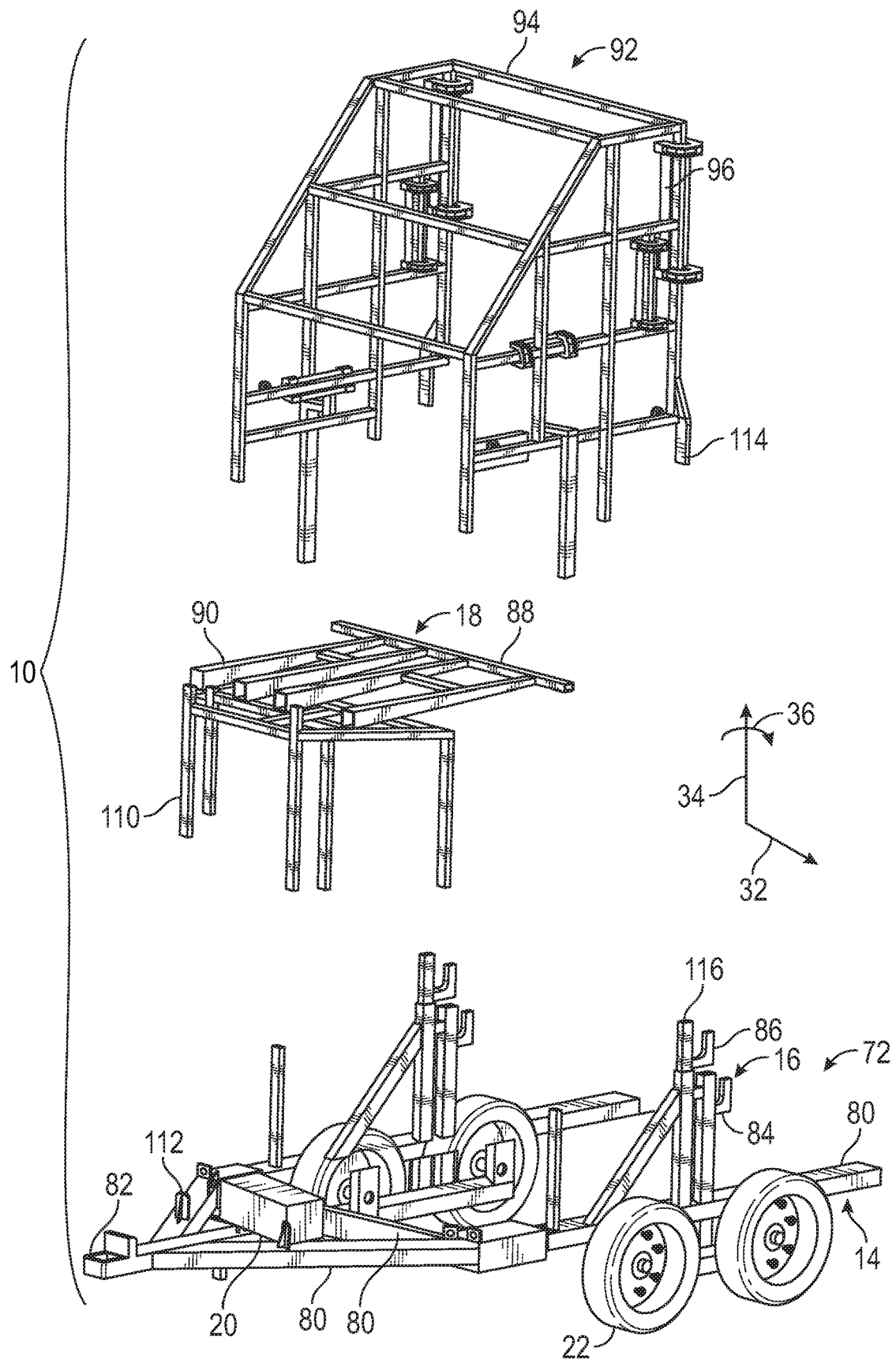
FIG. 5 is a perspective exploded view of an installation trailer according to embodiments of the present disclosure.

FIG. 5 illustrates a perspective exploded view of an embodiment of the installation trailer 10 to better show how the components of the installation trailer 10 may be coupled to one another in certain embodiments. In particular, the braking mechanism 18 may include one or more braking posts 110 that fit into one or more corresponding trailer frame braking posts 112. Similarly, the coil containment cage 92 may include one or more cage posts 114 that fit into one or more corresponding trailer frame cage posts 116. Thus, the modular and interchangeable design of the illustrated embodiment of the installation trailer 10 enables the functionality of the installation trailer 10 to be easily modified depending on the needs of a particular deployment. For example, different types of braking mechanisms 18 may be used or the coil containment cage 92 omitted when deploying reels 60. The posts 110, 112, 114, and 116 may be various types of hollow or solid posts, beams, columns, or stands coupled to each other using various fastening techniques, such as bolts, screws, pins, and so forth. In further embodiments where modularity or interchangeability is not used, the components of the installation trailer 10 may be coupled to one another via welding, brazing, or similar techniques.

Figure 6:
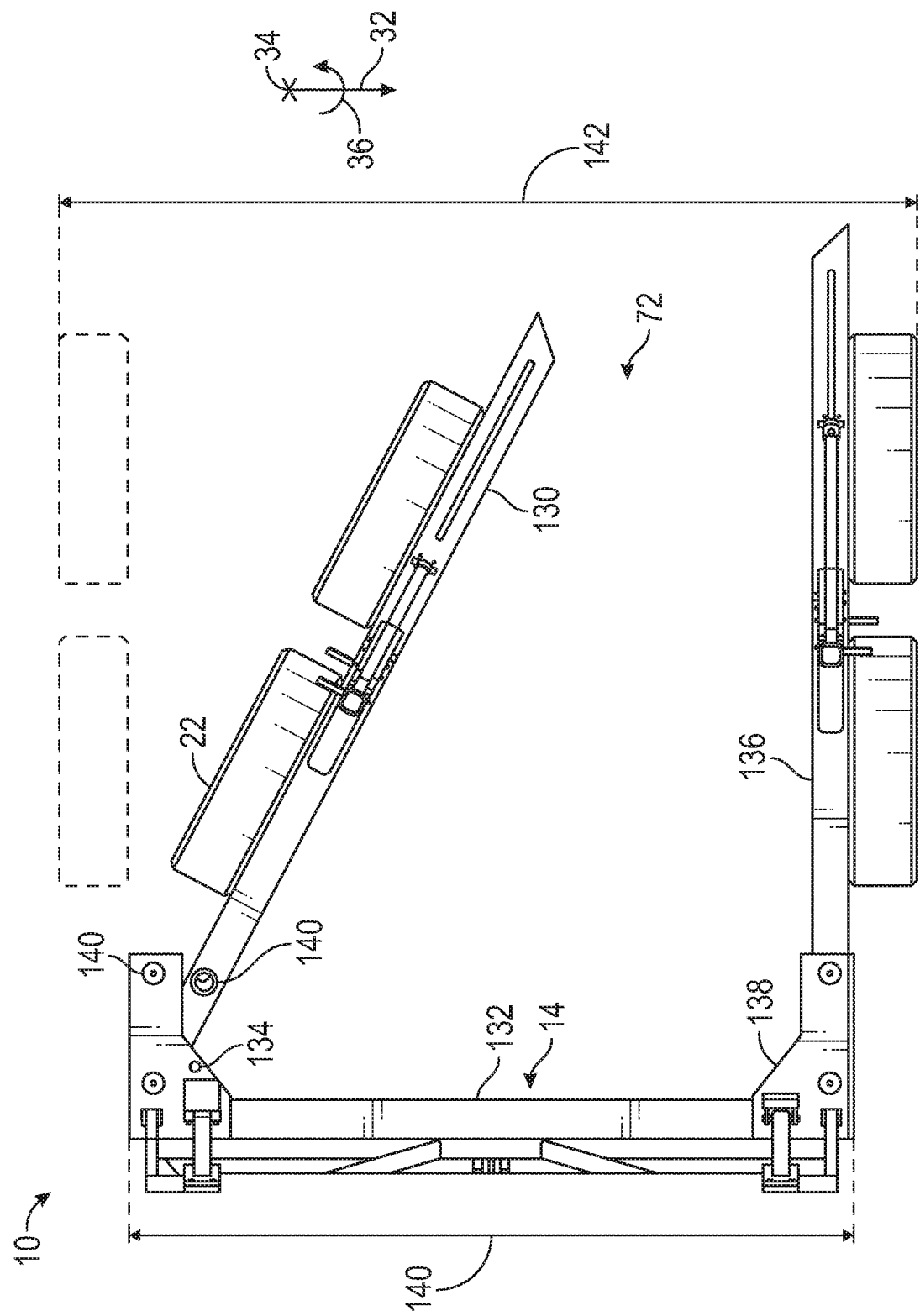
FIG. 6 is a top view of a portion of an installation trailer according to embodiments of the present disclosure.

FIG. 6 illustrates a top view of a portion of an embodiment of the installation trailer 10. In the illustrated embodiment, the trailer frame 14 includes a first rear structural member 130 coupled to a rear cross-member 132 via a first hinge 134 and a second rear structural member 136 coupled to the rear cross-member 132 via a second hinge 138. The first and second hinges 134 and 138 enable the trailer frame 14 to be collapsible such that a collapsed system width 140 is less than an expanded system width 142. In other words, the first and second hinges 134 and 138 enable the first and second rear structural members 130 and 136 to fold inward (e.g., collapsed configuration). As such, the wheels 22 do not extend beyond the collapsed system width 140 when the trailer frame 14 is in the collapsed configuration. In FIG. 6, the first rear structural member 130 is shown collapsed and the second rear structural member 136 is shown expanded. The collapsed system width 140 of the collapsed configuration may reduce transportation requirements associated with shipping the installation trailer 10. A hinge pin may be inserted into corresponding hinge openings 140 in the first and second hinges 134 and 138 and first and second rear structural members 130 and 136 to maintain the installation trailer 10 in the collapsed configuration or an expanded configuration (e.g., with the expanded system width 142). Other techniques may also be used to facilitate collapsing the installation trailer 10 as discussed below.

Figure 7:
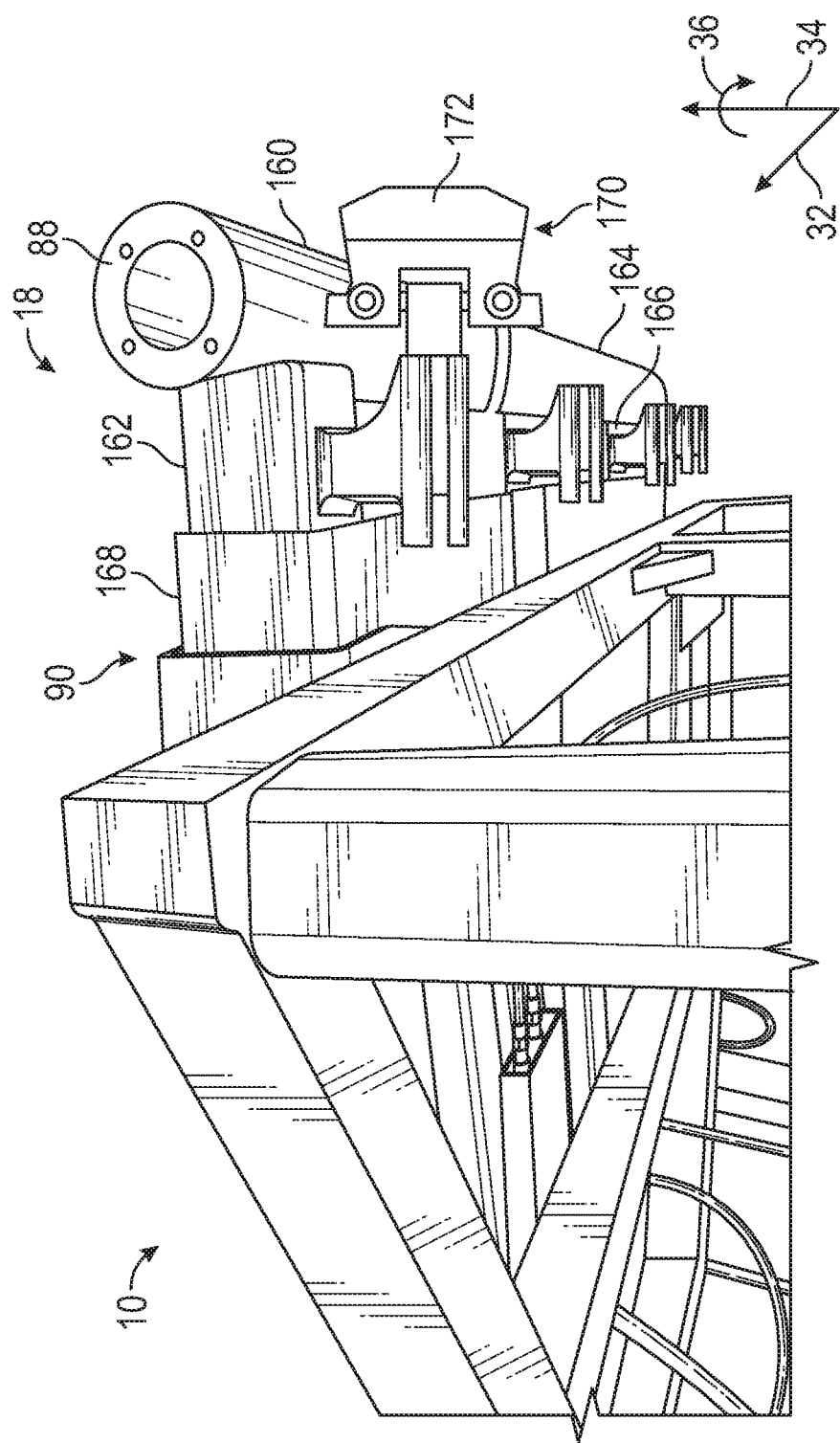
FIG. 7 is a perspective view of a portion of an installation trailer according to embodiments of the present disclosure.

FIG. 7 illustrates a perspective view of a portion of an embodiment of the installation trailer 10. In the illustrated embodiment, the braking mechanism 18 includes the pipe-contacting component 88 coupled to the support components 90. As shown in FIG. 7, the pipe-contacting component 88 includes a first pipe brake tube 160 coupled to one or more first pipe brake arms 162 and a second pipe brake tube 164 coupled to one or more second pipe brake arms 166. The first and second pipe brake arms 162 and 166 may fit within corresponding brake arm sockets 168 of the support components 90. The first and second pipe brake arms 162 and 166 may extend outward from the brake arm sockets 168 hydraulically (e.g., using the hydraulic power unit 20) or manually to contact the first and second pipe brake tubes 160 and 164 against the spoolable pipe 12 as it is being deployed. Thus, the braking mechanism 18 applies pressure to the spoolable pipe 12 and helps prevent undesired unspooling, free-spooling, or backlash of the spoolable pipe 12. In addition, by providing two pipe brake tubes 160 and 164, the braking mechanism 18 may be able to provide pressure axially 32 across the axial dimension 40 as the spoolable pipe 12 deploys. In other words, as a layer of spoolable pipe 12 deploys, the first portion of the axial dimension 40 where the spoolable pipe 12 has been deployed will have a smaller radial dimension 42 than a second portion of the axial dimension 40 where the spoolable pipe 12 has not been deployed. Thus, the first pipe brake tube 160 may extend further out of the brake arm sockets 168 to contact the first portion of the axial dimension 40 than the second pipe brake tube 164 contacting the second portion of the axial dimension 40. In further embodiments, the pipe-contacting component 88 may include more than two pipe brake tubes or the pipe-contacting component 88 may be configured as a single pipe brake tube.

In certain embodiments, one or more band cutters 170 may be attached to the pipe brake tubes 160 and 164, brake arms 162 and 166, brake arm sockets 168, or other portions of the braking mechanism 18. The band cutters 170 may include a cutting portion 172 that is sharpened to be able to cut through the bands 52. By coupling the band cutters 170 to the pipe brake tubes 160 and 164 or brake arms 162 and 166, the band cutters 170 may be in position to cut through the bands 52 because the pipe brake tubes 160 and 164 are in contact with the outer layer or layers of the coil 30. In certain embodiments, the band cutters 170 may be made from multiple components to enable the cutting portion 172 to be removed or replaced. In further embodiments, the band cutters 170 may be omitted and other techniques (e.g., manual band cutting) used to cut the bands 52. In general, the embodiments of the braking mechanism 18 and band cutters 170 shown in FIG. 7 may be used with any of the embodiments of the installation trailer 10 described herein.

Figure 8:
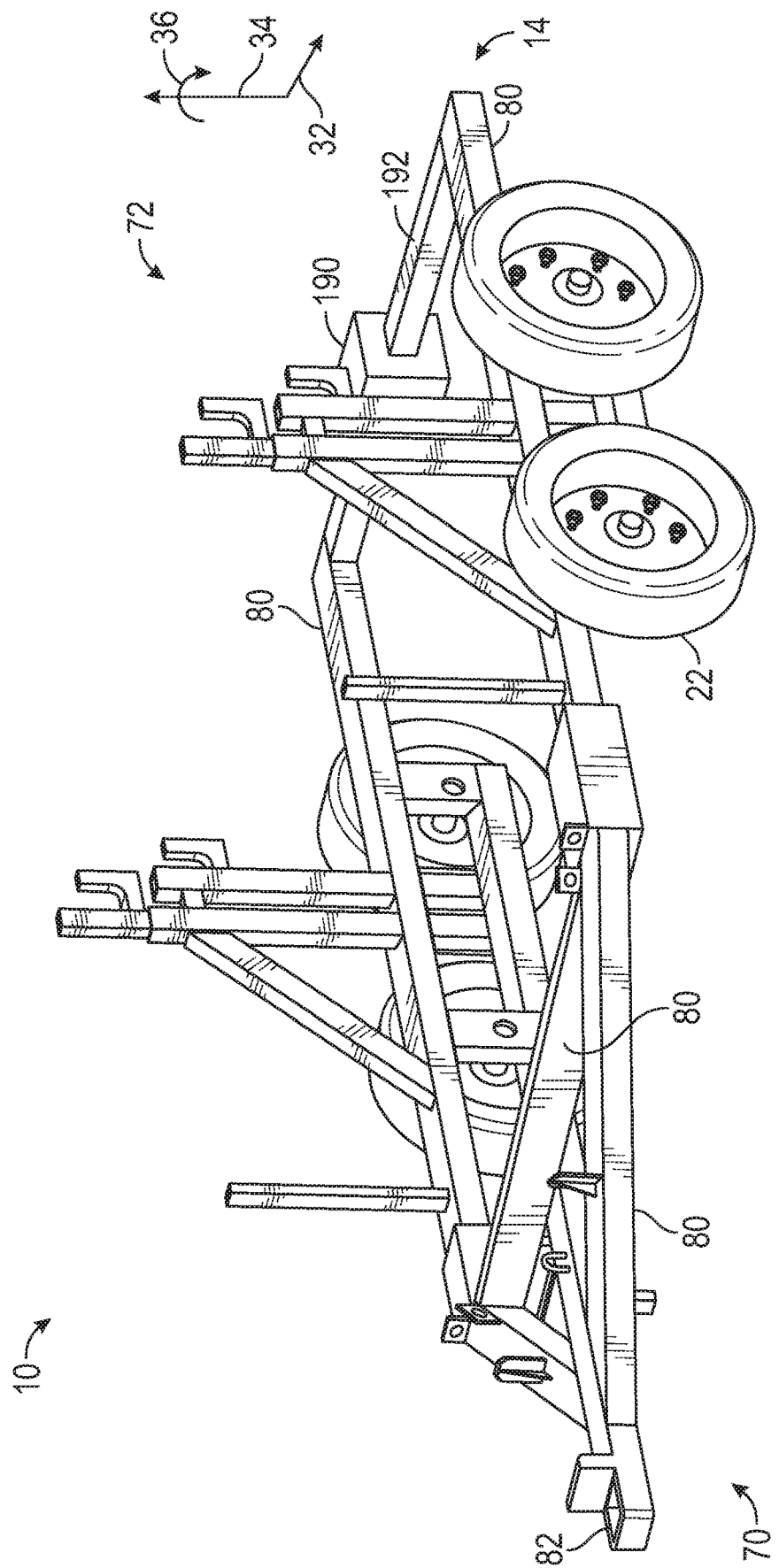
FIG. 8 is a perspective view of an installation trailer having a re-rounding mechanism according to embodiments of the present disclosure.

FIG. 8 illustrates a perspective view of an embodiment of the installation trailer 10 having a re-rounding mechanism 190 configured to re-round the deploying spoolable pipe 12. In the illustrated embodiment, the re-rounding mechanism 190 is coupled to structural members 80 of the trailer frame 14 via one or more re-rounding supports 192, which may be made from square steel tubing or steel I-beams, for example. In certain embodiments, the spoolable pipe 12 may have an oval cross-sectional shape when coiled. In other words, the spoolable pipe 12 may not have a circular cross-sectional shape. Embodiments of the re-rounding mechanism 190 may use rollers or other components with circular or partially-circular shapes to re-shape the spoolable pipe 12 to have a circular or substantially circular cross-sectional shape when the rollers or other components are engaged with or pressed against the spoolable pipe 12. For example, the re-rounding mechanism 190 may include one or more pairs of rollers located approximately 180 degrees apart from one another that engage with an outer surface of the spoolable pipe 12. Other types of re-rounding mechanisms 190 and re-rounding techniques may also be used. For example, the re-rounding mechanisms 190 may use a clamp or other device to push against some or all of the outer surface of the spoolable pipe 12. In certain embodiments, the re-rounding mechanisms 190 may be configured to move axially 32 back and forth along the re-rounding support 192 as the spoolable pipe 12 deploys or the re-rounding mechanisms 190 may be configured to tilt or pivot in other ways to correspond to the orientation of the deploying spoolable pipe 12 and reduce any undesired forces exerted on the spoolable pipe 12. In general, the embodiment of the re-rounding mechanism 190 shown in FIG. 8 may be used with any of the embodiments of the installation trailer 10 described herein.

Figure 9:
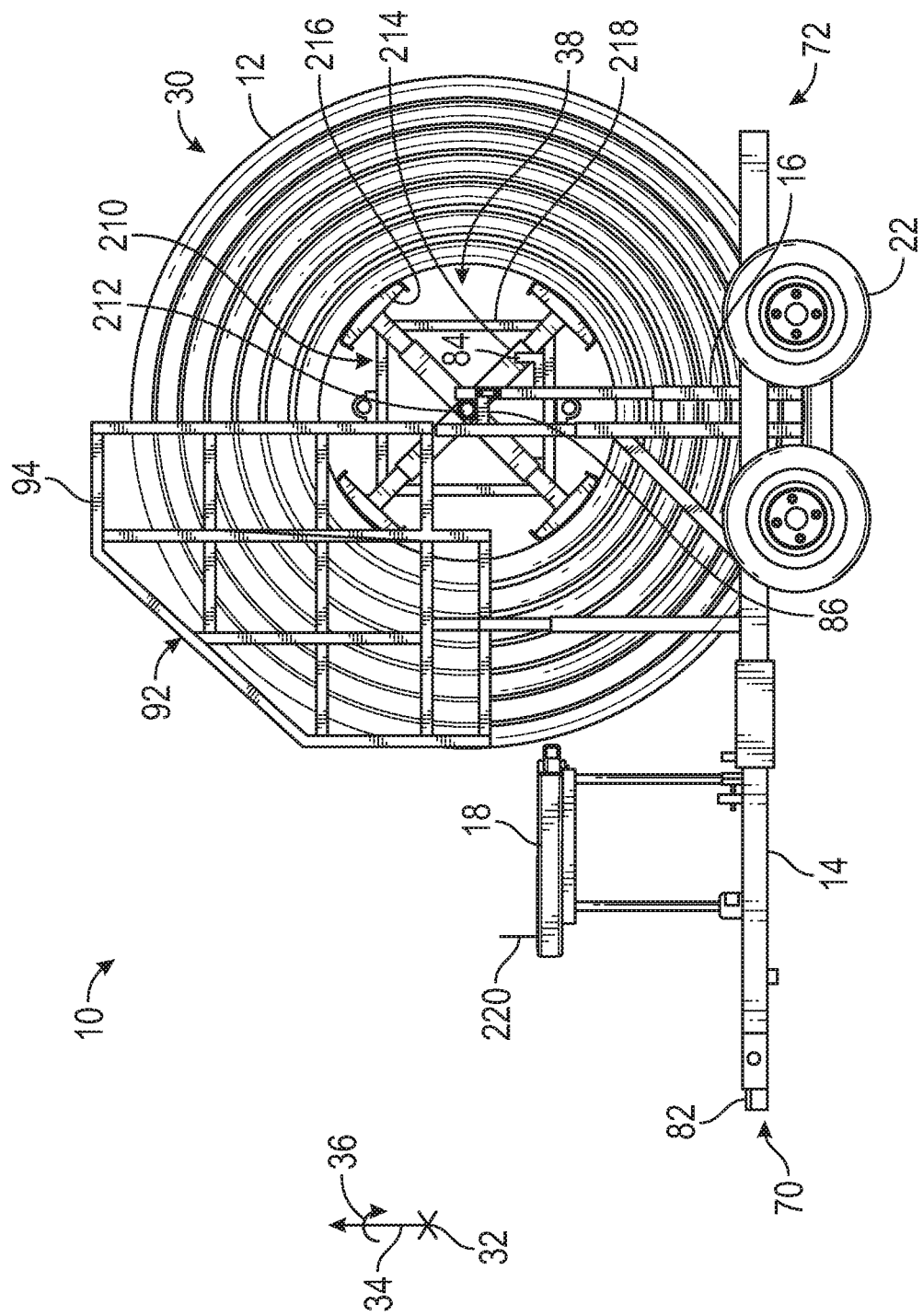
FIG. 9 is a side view of an installation trailer with a coil of spoolable pipe according to embodiments of the present disclosure.

FIG. 9 illustrates a side view of an embodiment of the installation trailer 10 with the coil 30 of the spoolable pipe 12 disposed about a drum assembly 210 that may be used to handle the coil 30 in a similar manner to the reel 60. However, use of the drum assembly 210 provides certain benefits over handling reels 60 of spoolable pipe 12. For example, one drum assembly 210 may be used to handle many coils 30 without the logistics associated with empty reels or spools. In addition, use of the drum assembly 10 enables heavier coils 30 of spoolable pipe 12 to be handled and transported because the weight of the reels 60 is not involved. In the illustrated embodiment, the drum assembly 210 includes a support bar 212, expandable spokes 214, drum segments 216, and spoke frames 218. The support bar 212 may be used to handle the drum assembly 10 and provide support for the various components of the drum assembly 210. The expandable spokes 214 may move between retracted and extended positions to enable the drum assembly 210 to be inserted or removed from the coil 30. The drum segments 216 may have a semi-circular shape to correspond to the semi-circular shape of the interior channel 38. When the drum assembly 210 is in the extended position, the drum segments 216 may contact the coil 30 with enough pressure on the interior channel 38 such that the coil 30 is secured to the drum assembly 210. The spoke frames 218 may be used to provide cross-support to the expandable spokes 214. As shown in FIG. 9, the support bar 212 may fit in either the lower or upper set of hooks 84 and 86 depending on an overall diameter of the coil 30. In further embodiments, other types of drum assemblies 210 may be used to deploy coils 30 using the installation trailer 10. In addition, the embodiment of the drum assembly 210 shown in FIG. 9 may be used with any of the embodiments of the installation trailer 10 described herein.

The side view of FIG. 9 also provides another perspective of some of the features of the installation trailer 10 discussed above. For example, the braking mechanism 18 is shown proximate the outermost layer of the coil 30, thereby providing pressure (or back tension) to the deploying spoolable pipe 12. In certain embodiments, the braking mechanism 18 may include one or brake stops 220 to help prevent the braking mechanism 18 from contacting the drum assembly 210, such as when all the spoolable pipe 12 has been deployed from the drum assembly 210. In certain embodiments, the brake stop 220 may be a pin that is inserted into the pipe brake arm 162 to prevent the pipe-contacting component 88 from traveling far enough to contact the drum assembly 210. The pin of the brake stop 220 may be inserted into different positions along the pipe brake arm 162 depending on the diameter of the drum assembly 210. In other embodiments, the brake stop 220 may be configured hydraulically or electrically to limit the travel of the pipe-contacting component 88 in a similar manner. In addition, the coil 30 is shown disposed within the coil containment cage 92.

Figure 10:
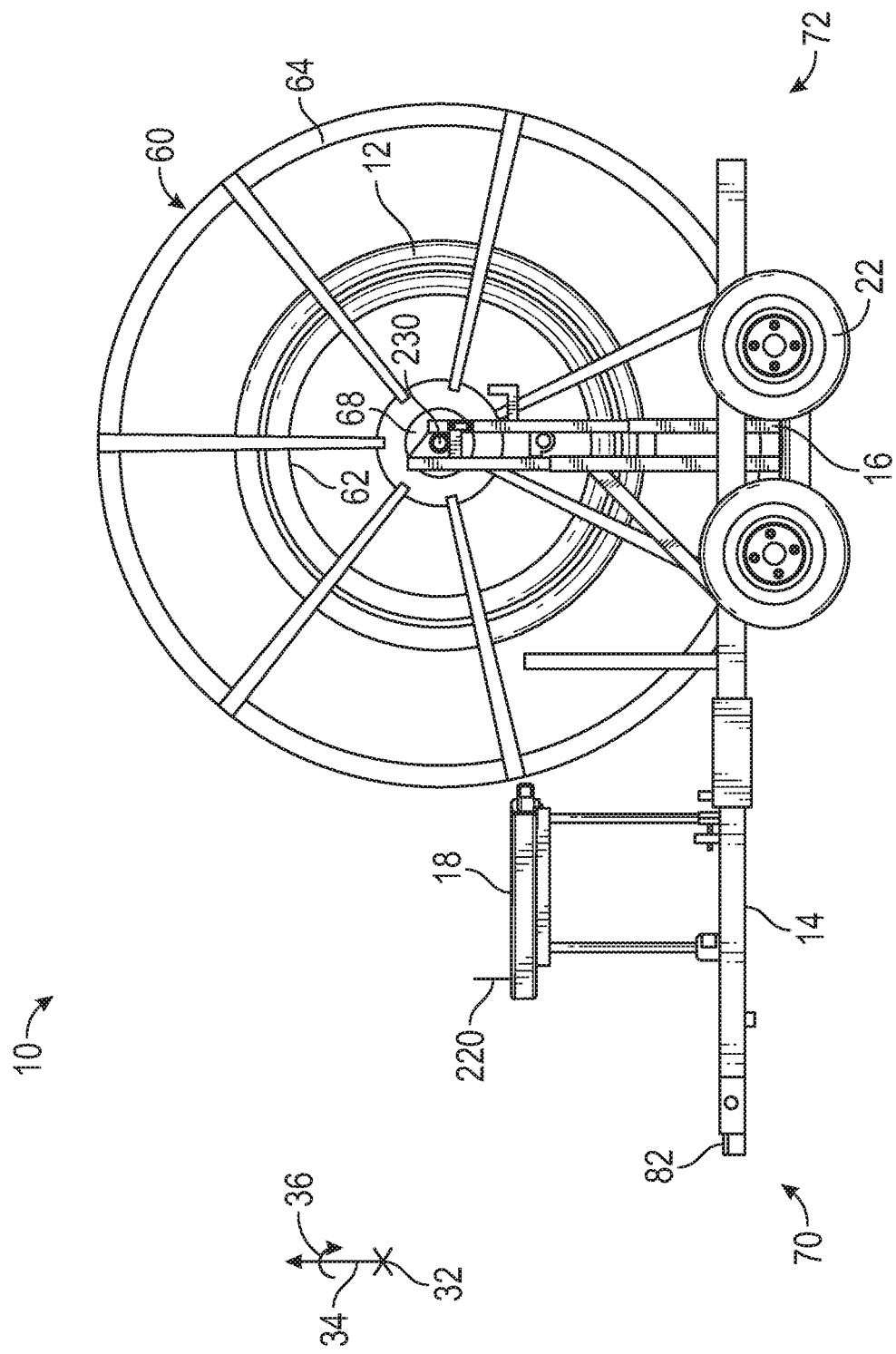
FIG. 10 is a side view of an installation trailer with a reel of spoolable pipe according to embodiments of the present disclosure.

FIG. 10 illustrates a side view of an embodiment of the installation trailer 10 with the reel 60 of the spoolable pipe 12. In the illustrated embodiment, a reel axle 230 has been inserted into the bore 68 of the reel 60 to enable the installation trailer 10 to deploy the spoolable pipe 12 from the reel 60. The reel axle 230 may be a solid cylinder of steel or similar metal capable of supporting the weight of the reel 60. Reel axle bushings or other types of bearings may be provided on the ends of the reel axle 230 or the bore 68 to reduce friction during rotation of the reel 60 during deployment of the spoolable pipe 12. The reel axle bushings may be secured by pins or similar devices. As shown in FIG. 10, the reel axle 230 may fit in either the lower or upper set of hooks 84 and 86 depending on an overall diameter of the reel 60. The braking mechanism 18 is shown proximate the outermost layer of the reel 60, thereby providing pressure to the deploying spoolable pipe 12. In certain embodiments, the braking mechanism 18 may also include brake stops 220 to help prevent the braking mechanism 18 from contacting the cylindrical drum 62, such as when all the spoolable pipe 12 has been deployed from the reel 60. As shown in FIG. 10, the coil containment cage 92 may not be used when deploying reels 60. Thus, embodiments of the installation trailer 10 may be used to deploy either coils 30 or reels 60, which may not be true of other trailers that lack the features of the installation trailer 10.

Figure 11:
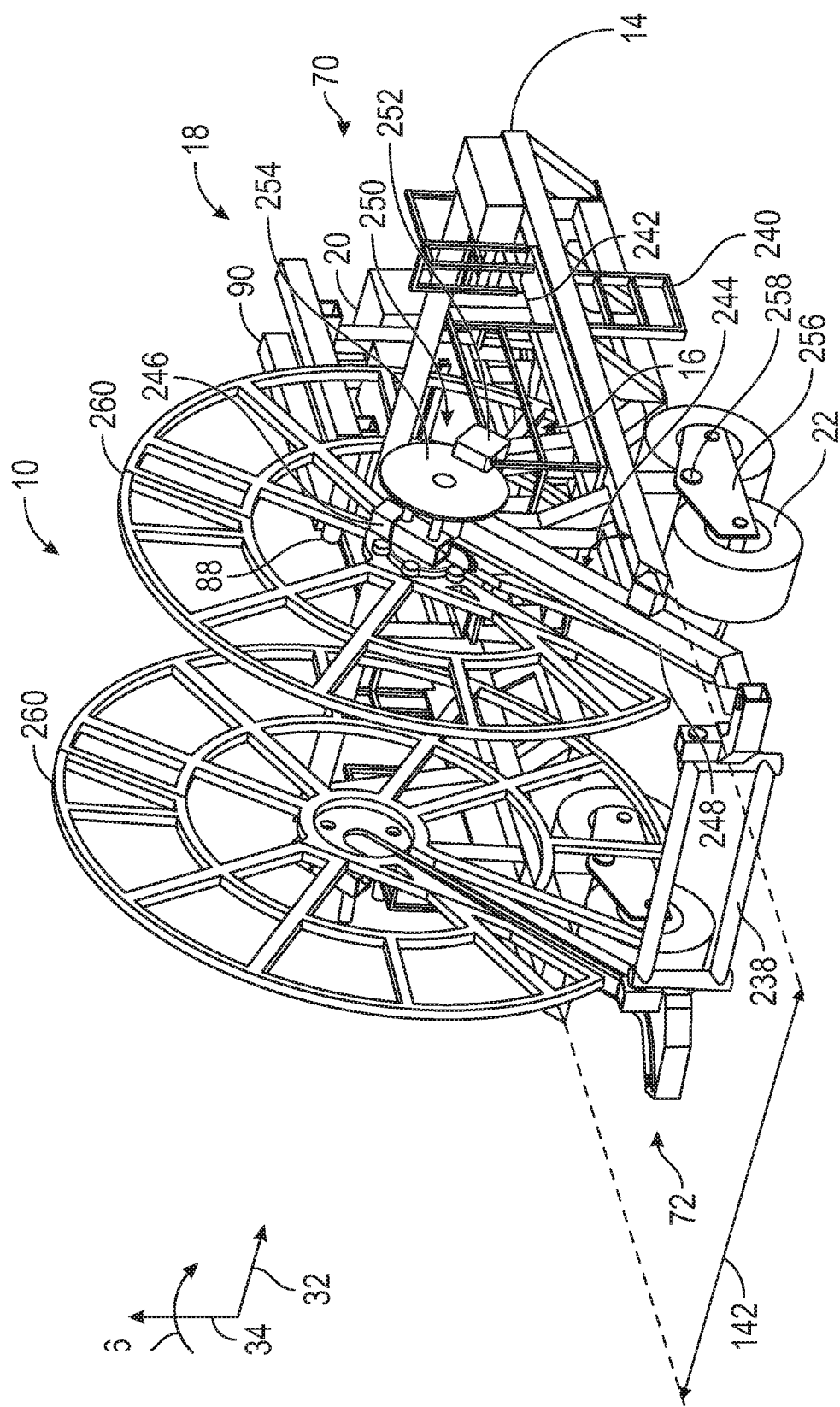
FIG. 11 is a perspective view of an installation trailer in an expanded configuration according to embodiments of the present disclosure.

FIG. 11 illustrates a perspective view of another embodiment of the installation trailer 10 in an expanded configuration. The illustrated embodiment of the installation trailer 10 includes several components described in detail above. For example, the installation trailer 10 includes the trailer frame 14, which may include a rear gate 238. The rear gate 238 may be opened to enable coils 30 or reels 60 to be inserted into the installation trailer 10. For example, the installation trailer 10 may be moved toward a stationary coil 30 or reel 60, which may then be coupled to the lifting mechanism 16, and the rear gate 238 closed prior to deployment. The rear gate 238 provides additional support and stability to the trailer frame 14 when the rear gate 238 is closed. In addition, the rear gate 238 may provide an additional support point for the spoolable pipe 12 as it deploys from the installation trailer 10. For example, the spoolable pipe 12 may rest on a lower or upper horizontal beam of the rear gate 238 during deployment. The trailer frame 14 may also include ladders 240 or platforms 242 for personnel access. Further, the trailer frame 14 may be collapsible, as described in detail below. As shown in FIG. 11, the installation trailer 10 has the expanded system width 142.

The embodiment of the installation trailer 10 shown in FIG. 11 may also include the lifting mechanism 16, which is configured to move coils 30 or reels 60 at an angle 244 with respect to the trailer frame 14. In particular, the lifting mechanism 16 may include an axle coupler 246 that moves along an inclined lifting beam 248, which may be accomplished manually, electrically, or hydraulically. Moving coils 30 or reels 60 at the angle 244 may reduce the amount of force compared to movement straight up or down. In FIG. 11, the braking mechanism 18 may include a caliper brake 250 that includes one or more calipers 252 disposed against a rotor 254, which may be coupled to the lifting mechanism 16. The caliper brake 250 may be used to slow or stop rotation of the coil 30 or reel 60 during deployment, thereby helping to prevent undesired unspooling, free-spooling, or backlash of the spoolable pipe 12. In general, the embodiment of the caliper brake 250 shown in FIG. 11 may be used with any of the embodiments of the installation trailer 10 described herein. Further, the braking mechanism 18 may include the pipe-contacting component 88 and support components 90 described above. The installation trailer 10 may also include the hydraulic power unit 20 disposed near the front side 70. In addition, the installation trailer may include wheels 22 disposed near the rear side 72. In the illustrated embodiment, the two wheels 22 on each side may be coupled to a frame 256 that tilts about a pivot 258 to enable the installation trailer 10 to move easily over uneven terrain.

The installation trailer 10 shown in FIG. 11 may be used to handle both coils 30 and reels 60. When deploying coils 30, containment flanges 260 may be used in a similar manner to the coil containment cage 92 described above. For example, the containment flanges 260 may serve a similar function as the reel ends 64 and 66 of the reel 60. In other words, the containment flanges 260 may block undesired movement of coils 30 of spoolable pipe 12, such as movement in the axial 32 direction outside the containment flanges 260 (e.g., side containment). As shown in FIG. 11, the containment flanges 260 may be coupled to the lifting mechanism 16. When the installation trailer 10 is used to deploy reels 60, the containment flanges 260 may be moved axially 32 to accommodate the reels 60. In other words, the two containment flanges 260 may be moved apart from one another to create additional space between the containment flanges 260. This feature may also be used to accommodate coils 30 with different axial dimensions 40. In other words, the two containment flanges 260 may be moved closer to one another for coils 30 with smaller axial dimensions 40 to adequately block undesired movement of the coils 30 outside the containment flanges 260. In general, the embodiment of the containment flanges 260 shown in FIG. 11 may be used with any of the embodiments of the installation trailer 10 described herein.

Figure 12:
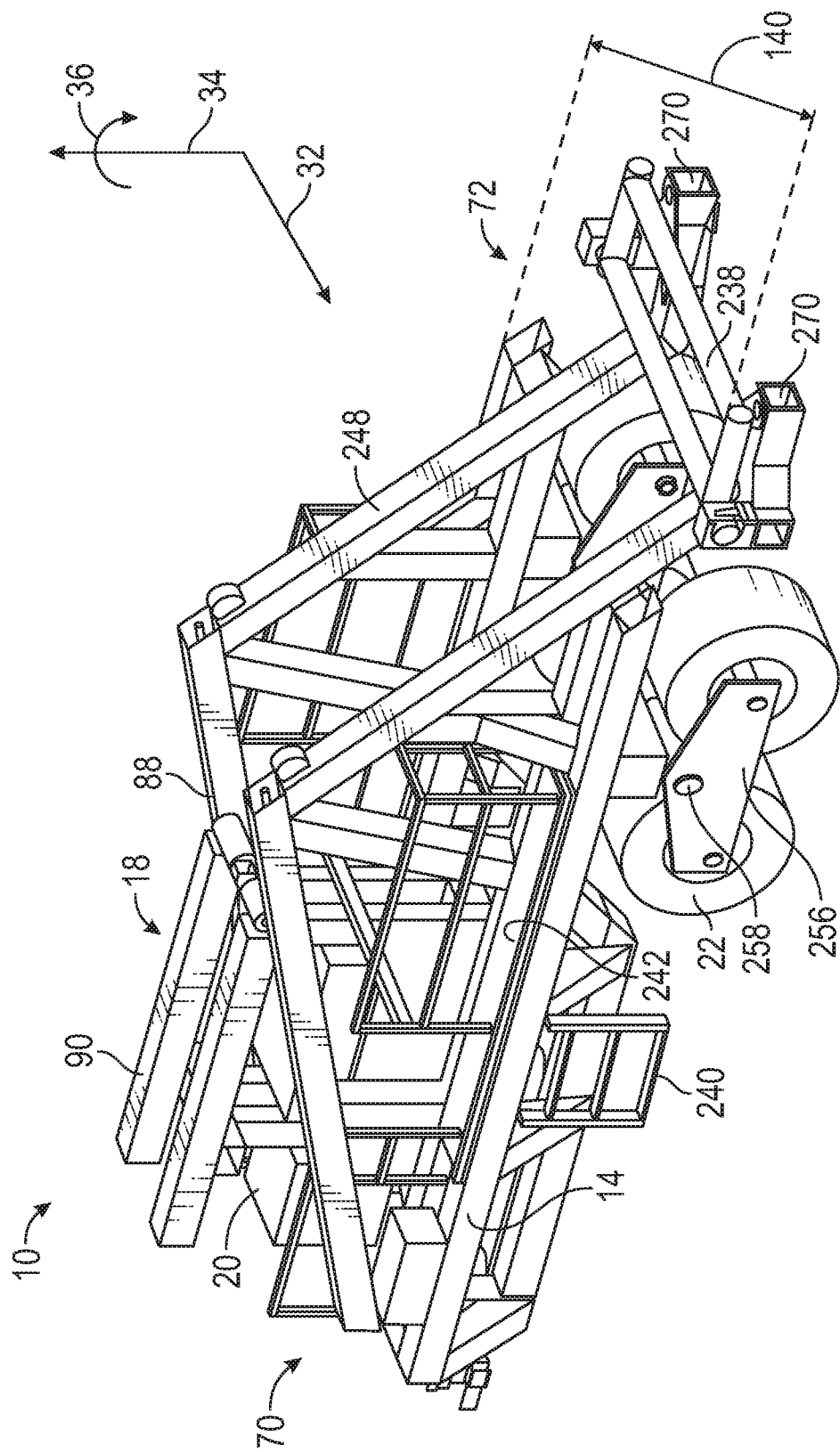
FIG. 12 is a perspective view of an installation trailer in a collapsed configuration according to embodiments of the present disclosure.

FIG. 12 illustrates a perspective view of an embodiment of the installation trailer 10 in a collapsed configuration, such that the collapsed system width 140 is less than the expanded system width 142 shown in FIG. 11. Certain features of the lifting mechanism 16 and braking mechanism 18 have been removed for clarity. The installation trailer 10 includes one or more hinges 270 that enable the installation trailer 10 to be collapsed and expanded. For example, the hinges 270 may allow structural members 80 of the trailer frame 14 to move toward each other. Additional hinges 270 (not shown) may be located near the front side 70 or in other locations to facilitate collapse of the installation trailer 10. In addition, the rear gate 238 may be configured to fold down as shown in FIG. 12.

Figure 13:
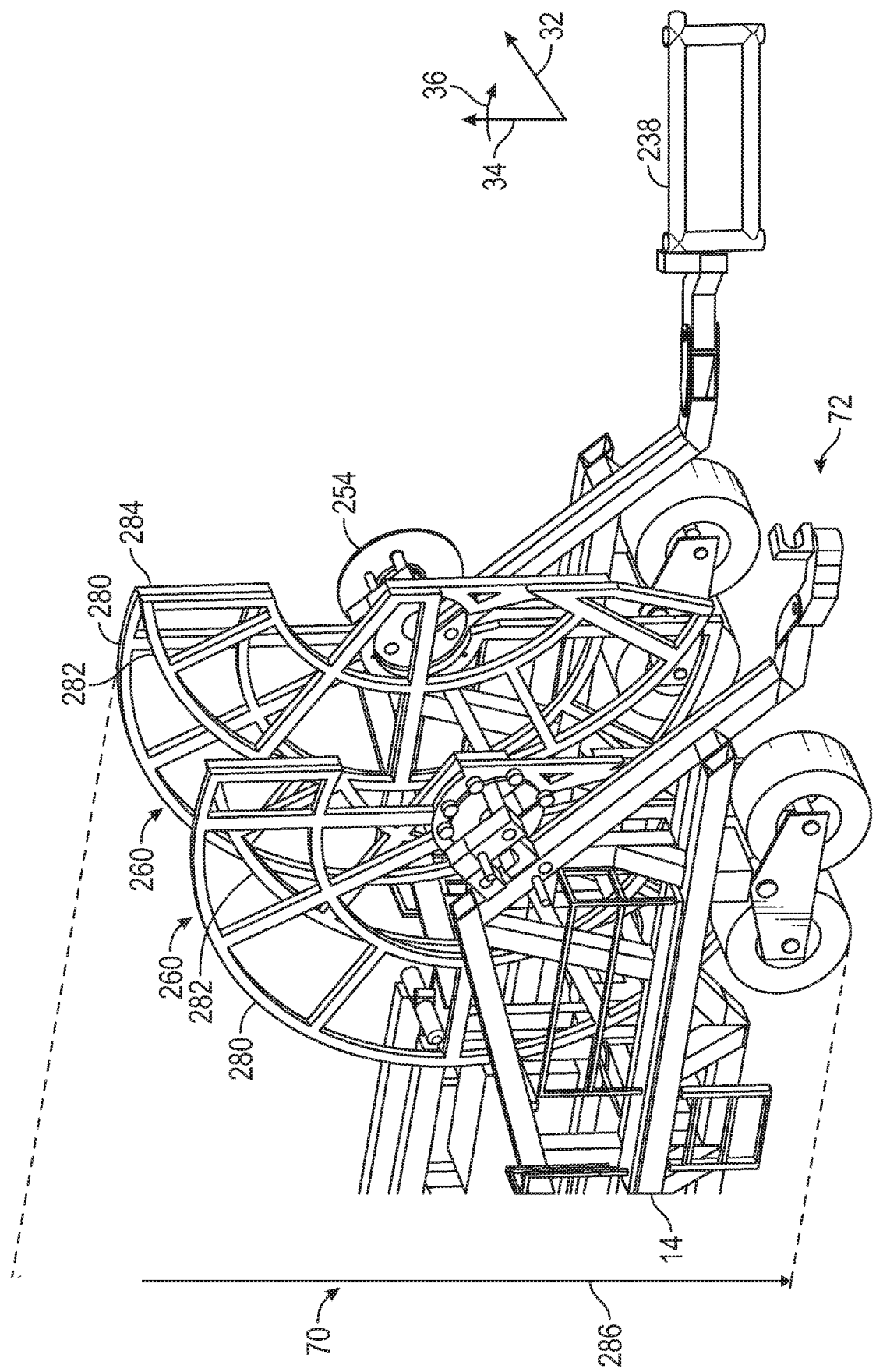
FIG. 13 is a perspective view of a portion of an installation trailer according to embodiments of the present disclosure.

FIG. 13 illustrates a perspective view of a portion of an embodiment of the installation trailer 10. In the illustrated embodiment, each of the containment flanges 260 may be made from a first flange component 280 coupled to a second flange component 282 via a flange hinge 284. Thus, the containment flanges 260 may be folded upon themselves to reduce the overall size of the containment flanges 260, such as during transport or shipping. Such embodiments of the containment flanges 260 may also be referred to as truncated containment flanges 260. For example, after the containment flanges 260 are folded, the containment flanges 260 may be rotated circumferentially 36 to have the flange hinges 284 pointing upwards, thereby reducing a height 286 of the installation trailer 10 when in the collapsed configuration. In addition, FIG. 13 shows the rear gate 238 in an open position, such as when coils 30 or reels 60 are inserted into the installation trailer 10.

Figure 14:
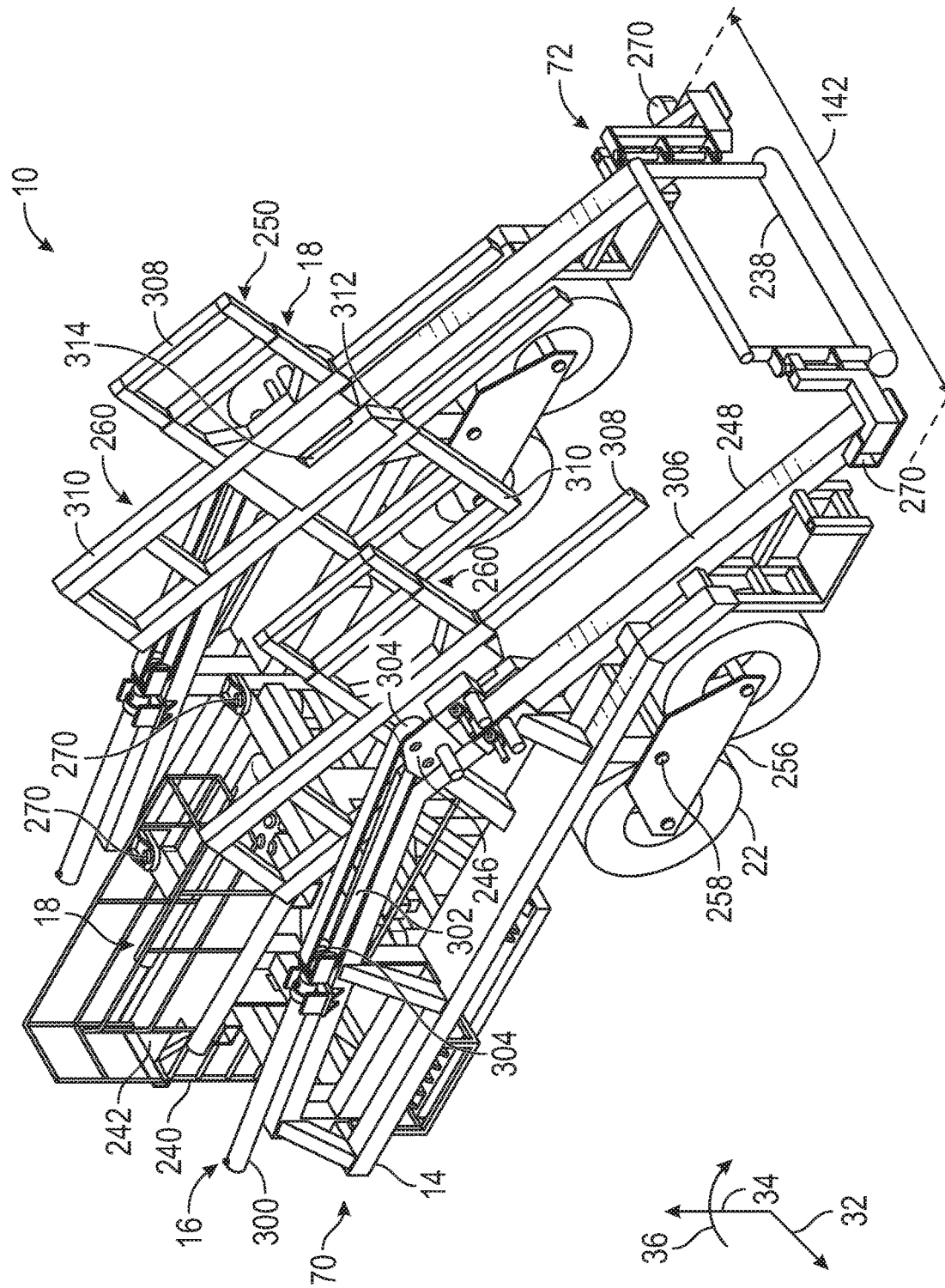
FIG. 14 is a perspective view of an installation trailer in an expanded configuration according to embodiments of the present disclosure.

FIG. 14 illustrates a perspective view of another embodiment of the installation trailer 10 in an expanded configuration. The illustrated embodiment of the installation trailer 10 includes several components described in detail above. For example, the lifting mechanism 16 includes the axle coupler 246 and inclined lifting beam 248. In addition, the lifting mechanism 16 may include a hydraulic cylinder 300 coupled to the axle coupler 246 via a lifting extension 302. The hydraulic cylinder 300 may be used to move the axle coupler 246 along the inclined lifting beam 248 to move coils 30 or reels 60 up or down. The lifting extension 302 may be a belt, chain, or similar device to effectively extend the reach of the hydraulic cylinder 300. One or both of the hydraulic cylinder 300 and axle coupler 246 may include rollers 304 to enable the lifting extension 302 to at least partially rotate about the rollers 304. In certain embodiments, a track or rail 306 may be formed in the inclined lifting beam 248 to enable the axle coupler 246 to securely move along the inclined lifting beam 248. In other embodiments, the lifting extension 302 may be omitted or other techniques used to move the axle coupler 246 along the inclined lifting beam 248.

In the illustrated embodiment of FIG. 14, the containment flanges 260 may be configured differently than that shown in FIG. 13. Specifically, the containment flanges 260 may include one or more containment flange extensions 308 configured to extend radially 34 out from the containment flanges 260. For example, each containment flange 260 may have two fixed portions 310 that extend in first and second circumferential 36 directions spaced approximately 90 degrees apart from one another and two containment flange extensions 308 that extend in third and fourth circumferential 36 directions spaced approximately 90 degrees apart from one another. Thus, the fixed portions 310 and containment flange extensions 308 together provide containment evenly about the containment flanges 260. Further, retraction of the containment flange extensions 308 reduces the overall dimensions of the containment flanges 260 and the installation trailer 10, which may be useful when the installation trailer 10 is shipped or transported. The containment flange extensions 308 may be extended manually or hydraulically. In certain embodiments, the containment flanges 260 include drive sections 312, which may be configured to engage with the support bar 212 of the drum assembly 210 or the reel axle 230 of the reel 60. As shown in FIG. 14, the drive sections 312 may include an opening 314 with a shape complementary to that of the support bar 212 or the reel axle 230 such that rotation of the support bar 212 or the reel axle 230 causes rotation of the containment flanges 260. For example, the opening 314 may have a generally rectangular shape to engage with a generally square or rectangular cross-sectional shape of the support bar 212 or the reel axle 230. In general, the embodiment of the containment flanges 260 shown in FIG. 14 may be used with any of the embodiments of the installation trailer 10 described herein.

Figure 15:
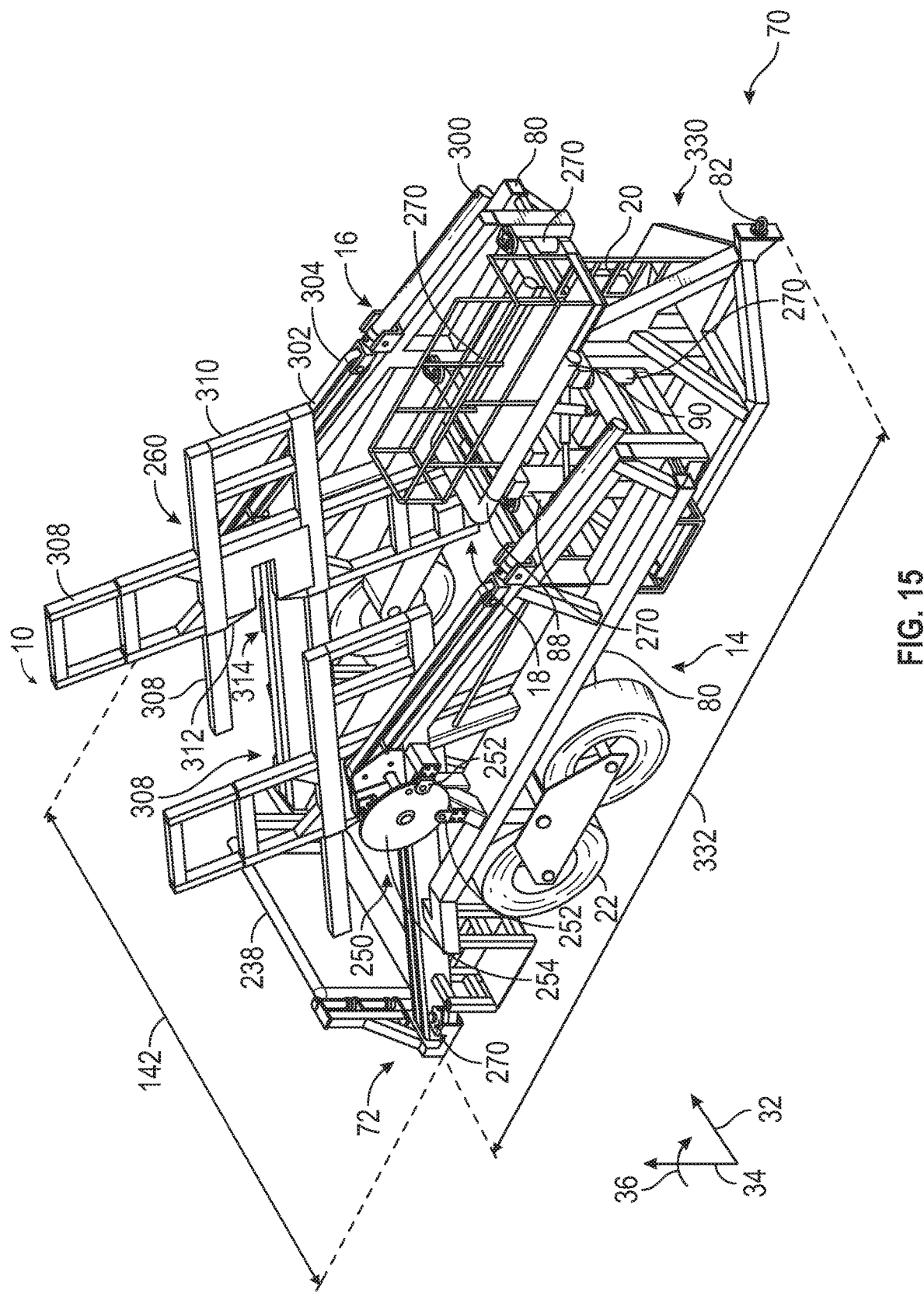
FIG. 15 is a perspective view of an installation trailer from a front side according to embodiments of the present disclosure.

FIG. 15 illustrates a perspective view of the embodiment of the installation trailer 10 shown in FIG. 14, but from the front side 70. In the illustrated embodiment, four hinges 270 are located near the front side 70, which may enable a front section 330 of the installation trailer 10 to move perpendicular to the axial 32 direction (e.g., toward or away from the front side 70). In other words, when the hinges 270 are extended (e.g., approximately parallel to the axial 32 direction), the front section 330 may be extended toward the front side 70, which also extends the side structural members 80 outwards (e.g., axially 32) so the installation trailer 10 is at the expanded system width 142 and a length 332 of the installation trailer 10 is also increased. When the hinges 270 are retracted (e.g., approximately perpendicular to the axial 32 direction), the front section 330 may be retracted toward the rear side 72, which also retracts the side structural members 80 inward, as described in detail below.

Figure 16:
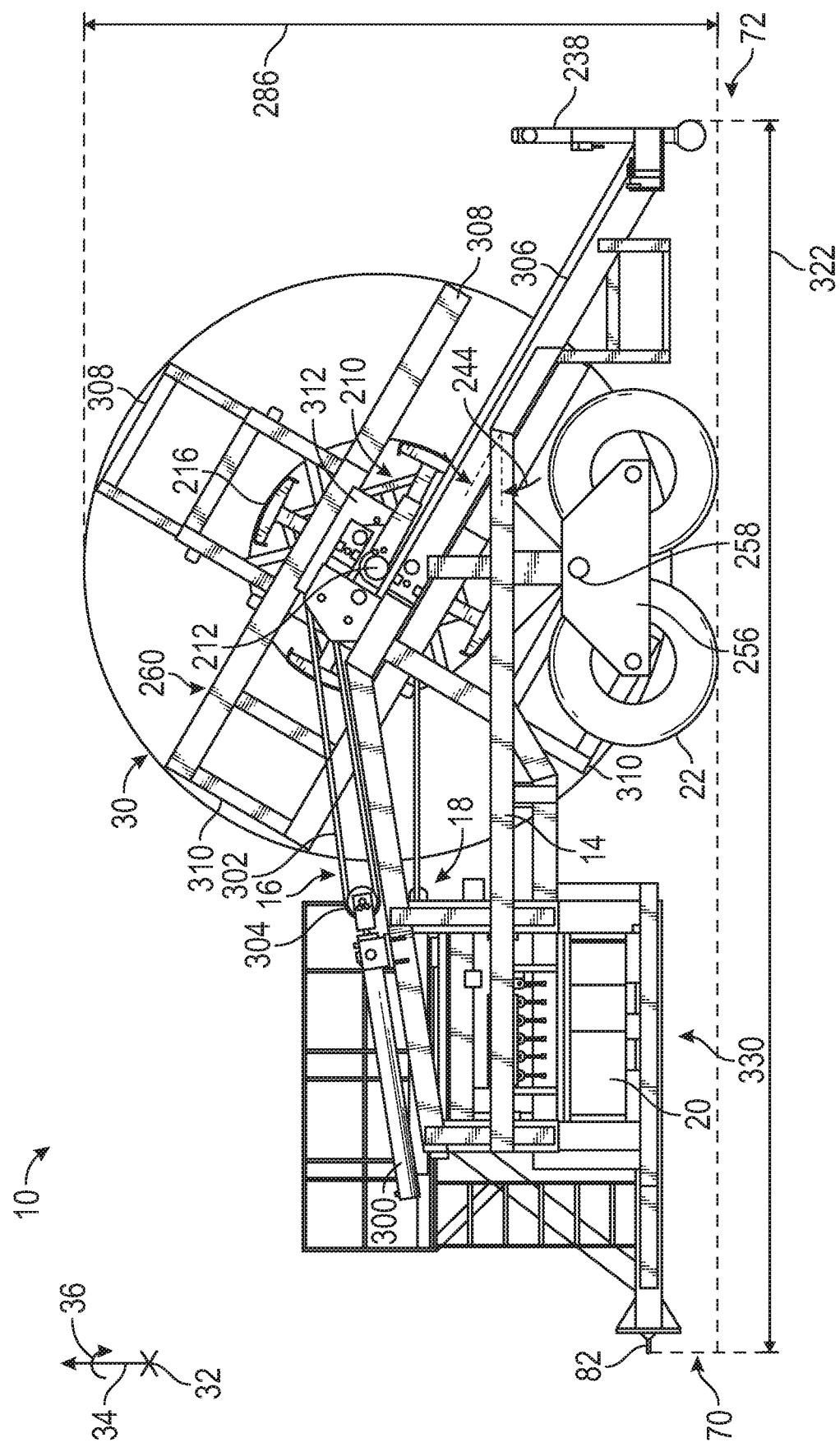
FIG. 16 is a side view of an installation trailer according to embodiments of the present disclosure.

FIG. 16 illustrates a side view of the embodiment of the installation trailer 10 shown in FIGS. 14 and 15. In the illustrated embodiment, the angle 244 of the inclined lifting beam 248 is shown with respect to the horizontal portion of the trailer frame 14. Thus, the lifting mechanism 16 is used to move the coil 30 or reel 60 along the angle 244, which also adjusts the height of the coil 30 or reel 60 above the surface that the installation trailer 10 is on. Further, the illustrated embodiment shows the use of the drum assembly 210 to handle the coil 30. In other embodiments, reels 60 may be handled in a similar manner as discussed above. The illustrated embodiment also shows how the containment flanges 260 provide containment across the diameter of the coil 30 via the use of the containment flange extensions 308 and the fixed portions 310. Finally, FIG. 16 shows the height 286 and length 332 of the installation trailer 10 in the expanded configuration.

Figure 17:
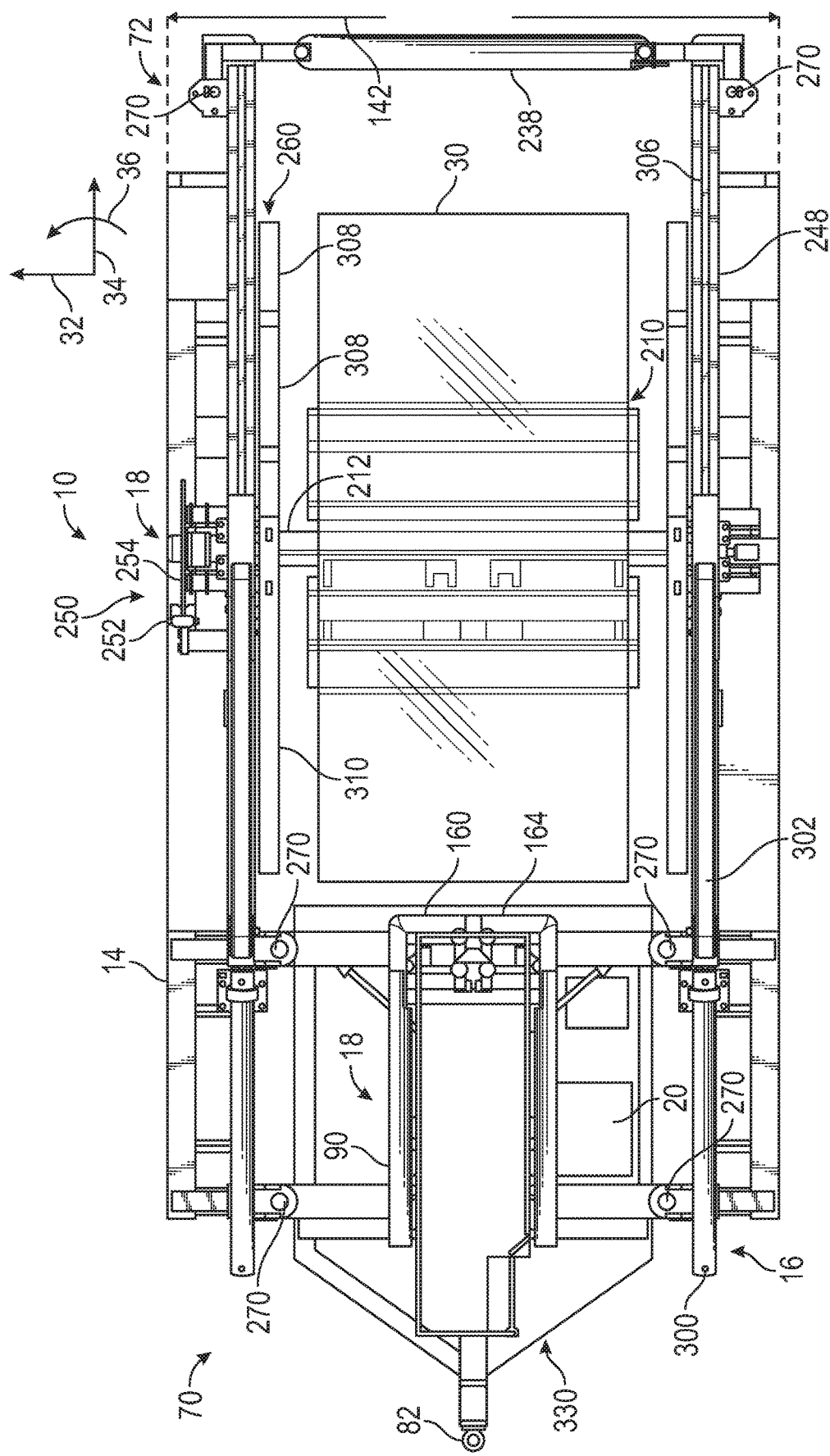
FIG. 17 is a top view of an installation trailer according to embodiments of the present disclosure.

FIG. 17 is a top view of the embodiment of the installation trailer 10 shown in FIGS. 14-16. In the illustrated embodiment, the front section 330 is located extended toward the front side 70 since the installation trailer 10 is in the expanded configuration. Accordingly, the installation trailer 10 is shown with the expanded system width 142. Other aspects of the installation trailer 10 are described above.

Figure 18:
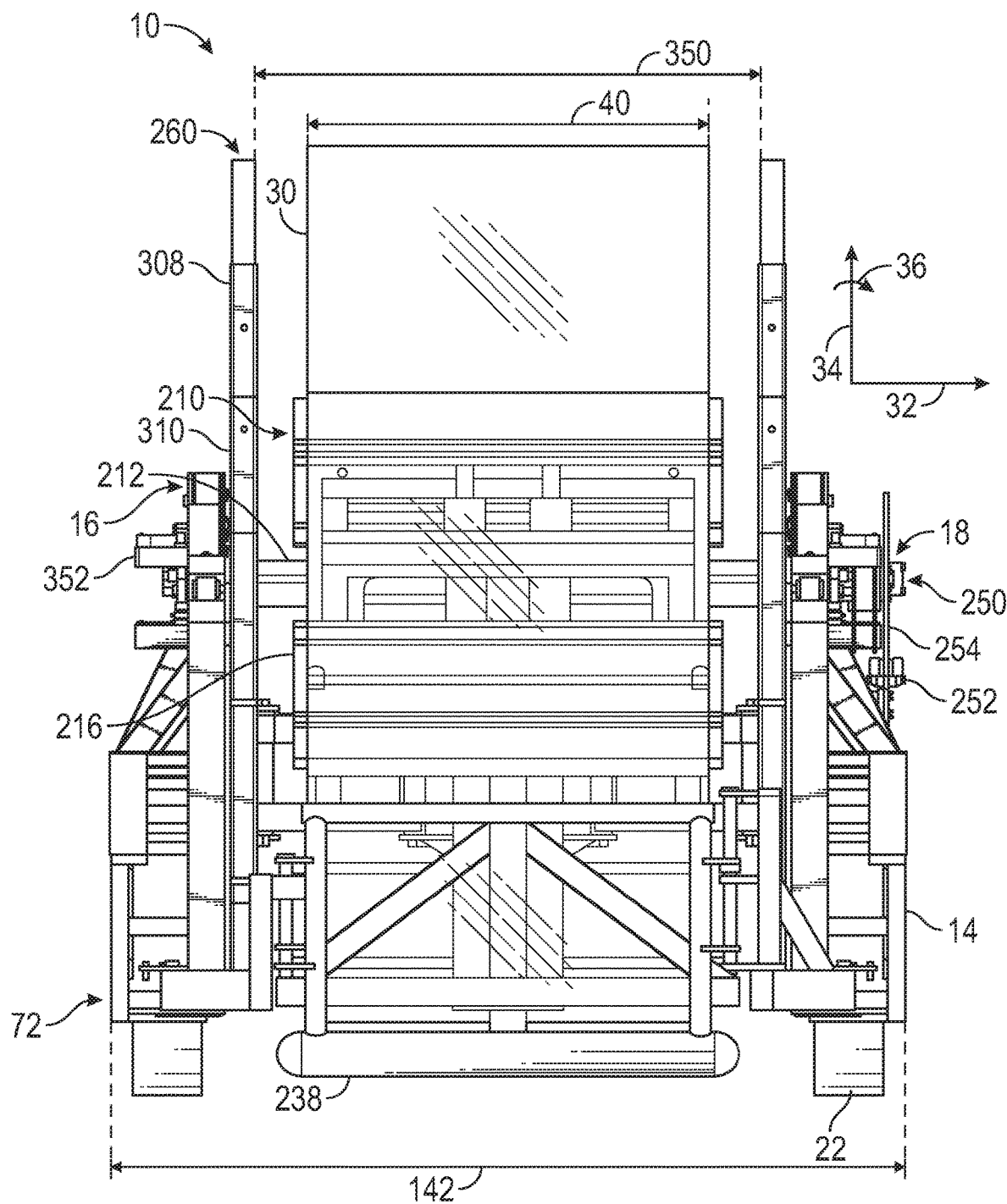
FIG. 18 is a rear view of an installation trailer according to embodiments of the present disclosure.

FIG. 18 illustrates a rear view of the embodiment of the installation trailer 10 shown in FIGS. 14-17. In the illustrated embodiment, the coil 30 is shown with the axial dimension 40 and the installation trailer 10 is shown with containment flange width 350. In certain embodiments, the containment flanges 260 may be adjustable axially 32 to accommodate coils 30 with different axial dimensions 40. In other words, the containment flanges 260 may be moved inward toward each other so that the containment flange width 350 is substantially the same as the axial dimension 40 of the coil 30, which may reduce the potential for the spoolable pipe 12 to move outside of the axial dimension 40. In certain embodiments, one or more containment posts 352 may be coupled to containment flanges 260 to enable the containment flanges 260 to move axially 32. In other words, the containment posts 352 may extend outward from the lifting mechanism 16 when the containment flanges 260 are retracted away from the coil 30 and the containment posts 352 may not extend outward or extend less from the lifting mechanism 16 when the containment flanges 260 are extended against the coil 30. The containment posts 352 may be circular steel posts or similar columns or beams configured to extend through openings formed in the lifting mechanism 16. Other aspects of the installation trailer 10 are described above.

Figure 19:
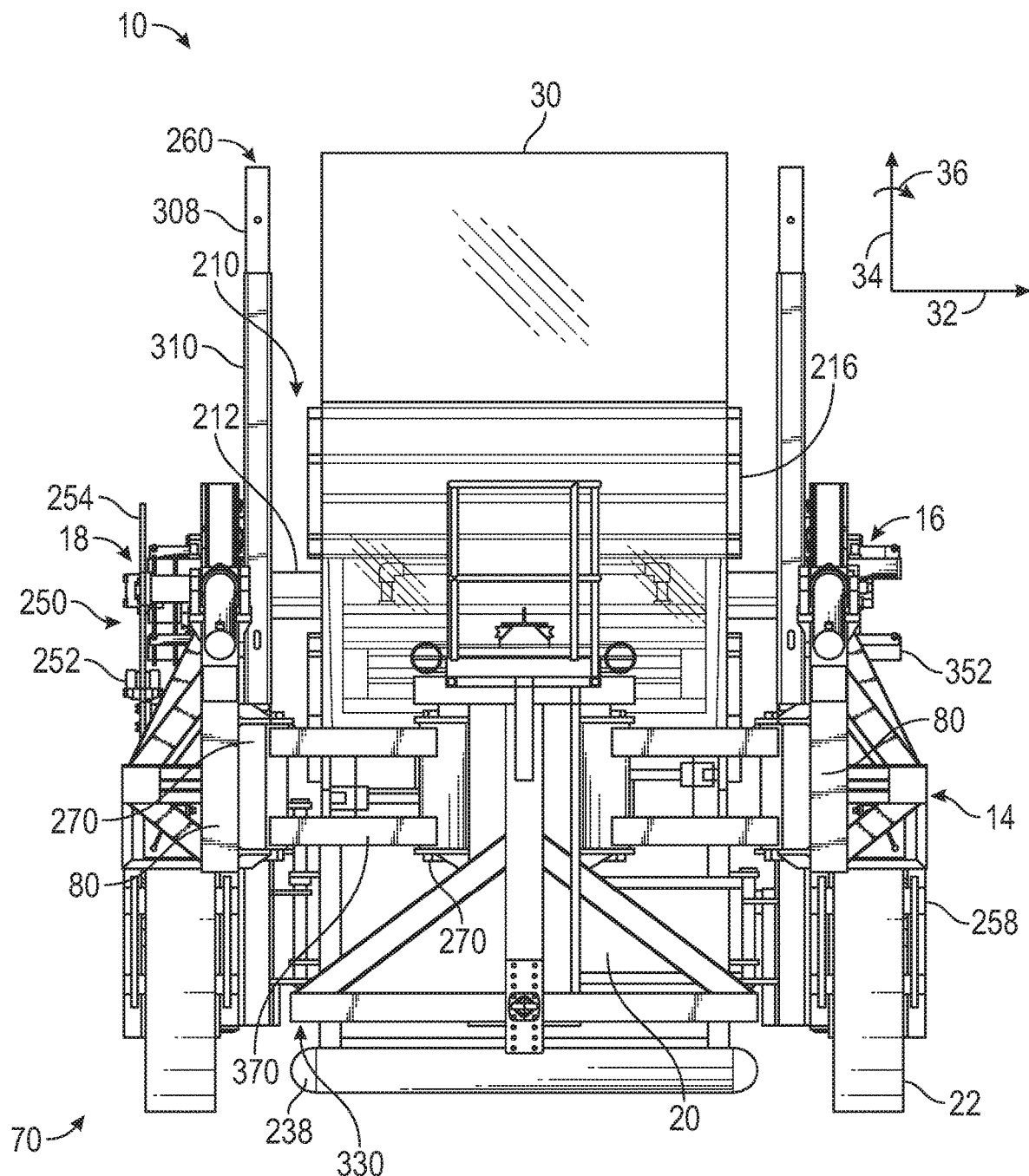
FIG. 19 is a front view of an installation trailer according to embodiments of the present disclosure

FIG. 19 illustrates a front view of the embodiment of the installation trailer 10 shown in FIGS. 14-18. In the illustrated embodiment, the hinges 270 are shown in more detail. For example, the hinges 270 on the front section 330 may be coupled to hinges 270 on the side structural members 80 by leaves 370. Thus, the leaves 370 are generally aligned with the axial axis 32 when the installation trailer 10 is in the extended configuration. Other aspects of the installation trailer 10 are described above.

Figure 20:
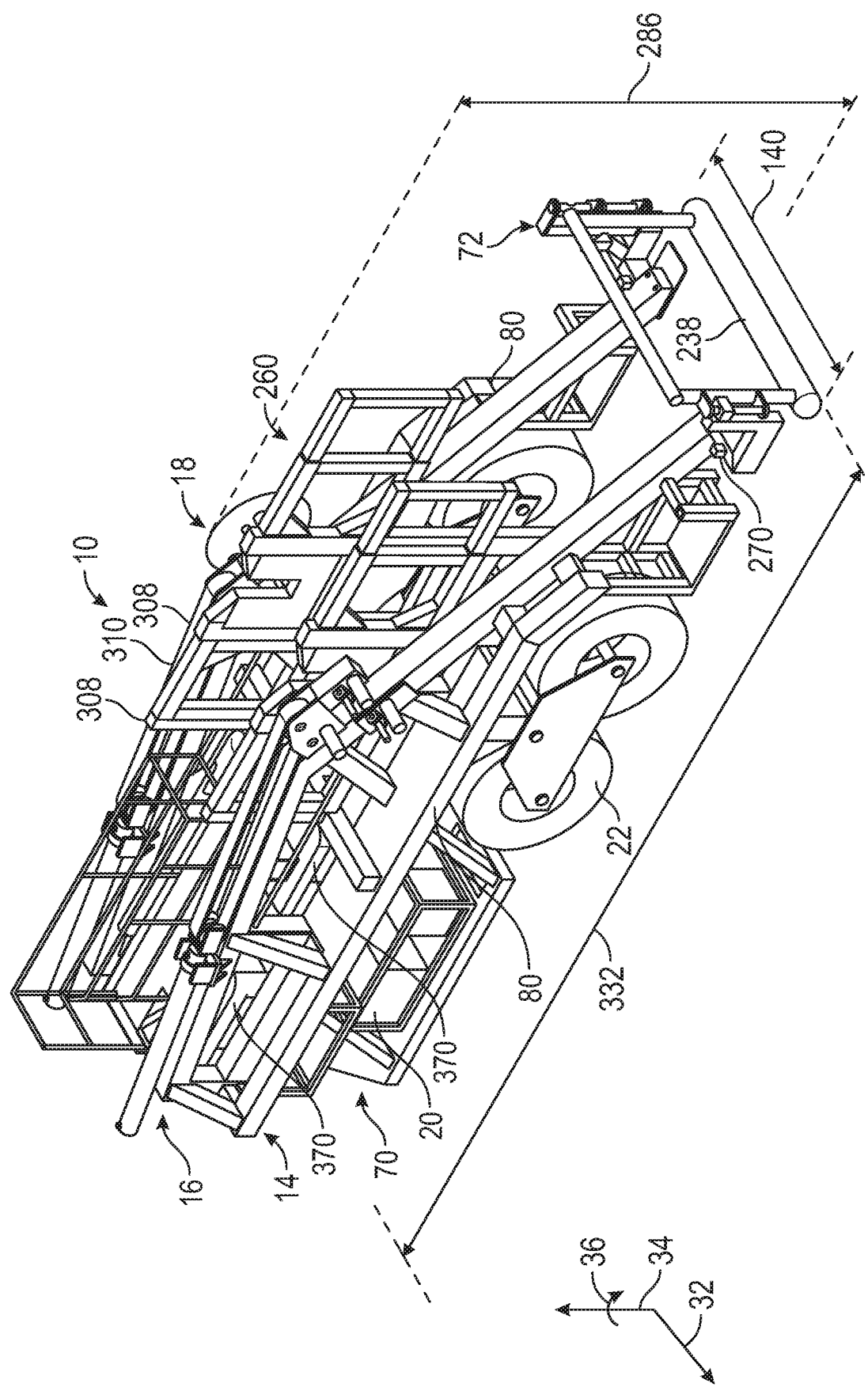
FIG. 20 is a perspective view of an installation trailer in a collapsed configuration according to embodiments of the present disclosure.

FIG. 20 illustrates a perspective view of the embodiment of the installation trailer 10 shown in FIGS. 14-19 in the collapsed configuration. In the illustrated embodiment, the side structural members 80 have moved in toward one another via the hinges 270 so that the installation trailer 10 has the collapsed system width 140. In addition, the containment flange extensions 308 have been retracted into the containment flanges 260 and the containment flanges 260 rotated circumferentially 36 to reduce the height 286 of the installation trailer 10, thereby reducing the size and associated costs and logistics associated with shipping or transporting the installation trailer 10. In addition, the leaves 370 have folded inward to be approximately perpendicular to the axial axis 32, thereby moving the front section 330 toward the rear side 72 and reducing the length 332 of the installation trailer 10.

Figure 21:
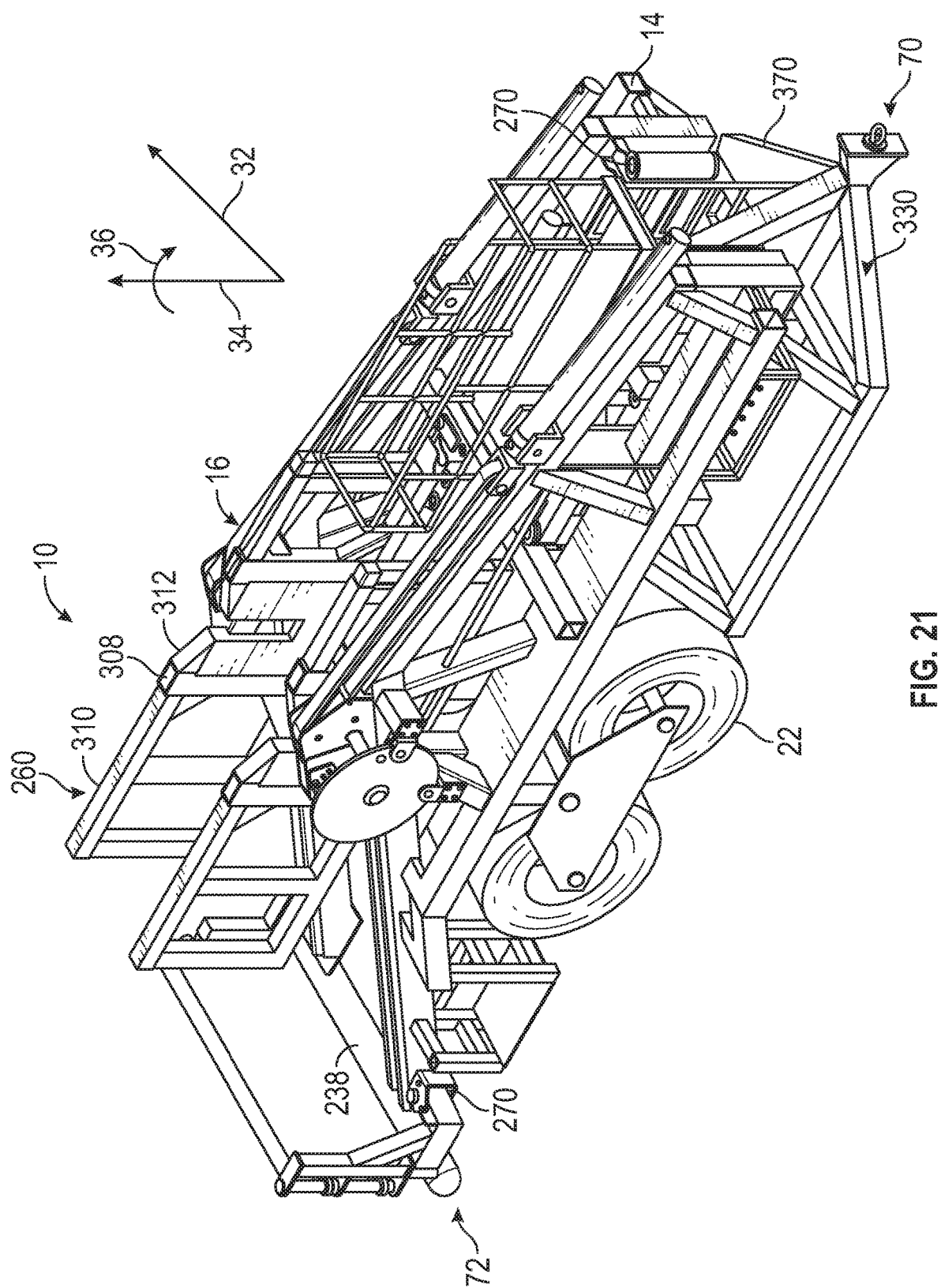
FIG. 21 is a perspective view of an installation trailer from a front side according to embodiments of the present disclosure.

FIG. 21 illustrates a perspective view of the embodiment of the installation trailer 10 shown in FIG. 20, but from the front side 70. Again, the leaves 370 are shown folded inward to be approximately perpendicular to the axial axis 32, thereby moving the front section 330 toward the rear side 72 and reducing the length 332 of the installation trailer 10. Other aspects of the installation trailer 10 are described above.

Figure 22:
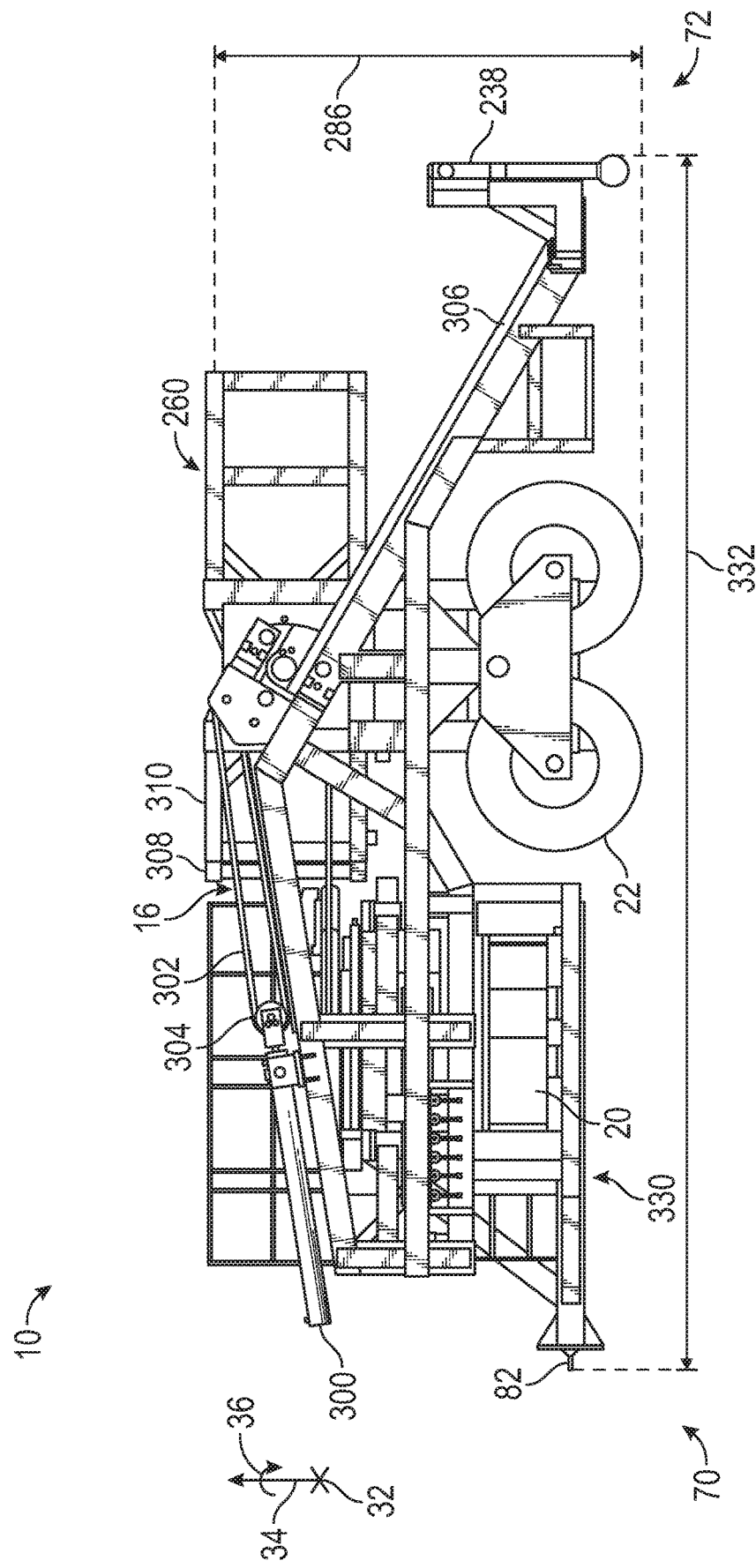
FIG. 22 is a side view of an installation trailer shown in according to embodiments of the present disclosure.

FIG. 22 illustrates a side view of the embodiment of the installation trailer 10 shown in FIGS. 20 and 21. In the illustrated embodiment, the containment flanges 260 are rotated circumferentially 36 to reduce the diameter of the containment flanges 260, thereby reducing the height 286 of the installation trailer 10 in the retracted configuration. In addition, the front section 330 is moved toward the rear side 72, thereby reducing the length 332 of the installation trailer 10.

Figure 23:
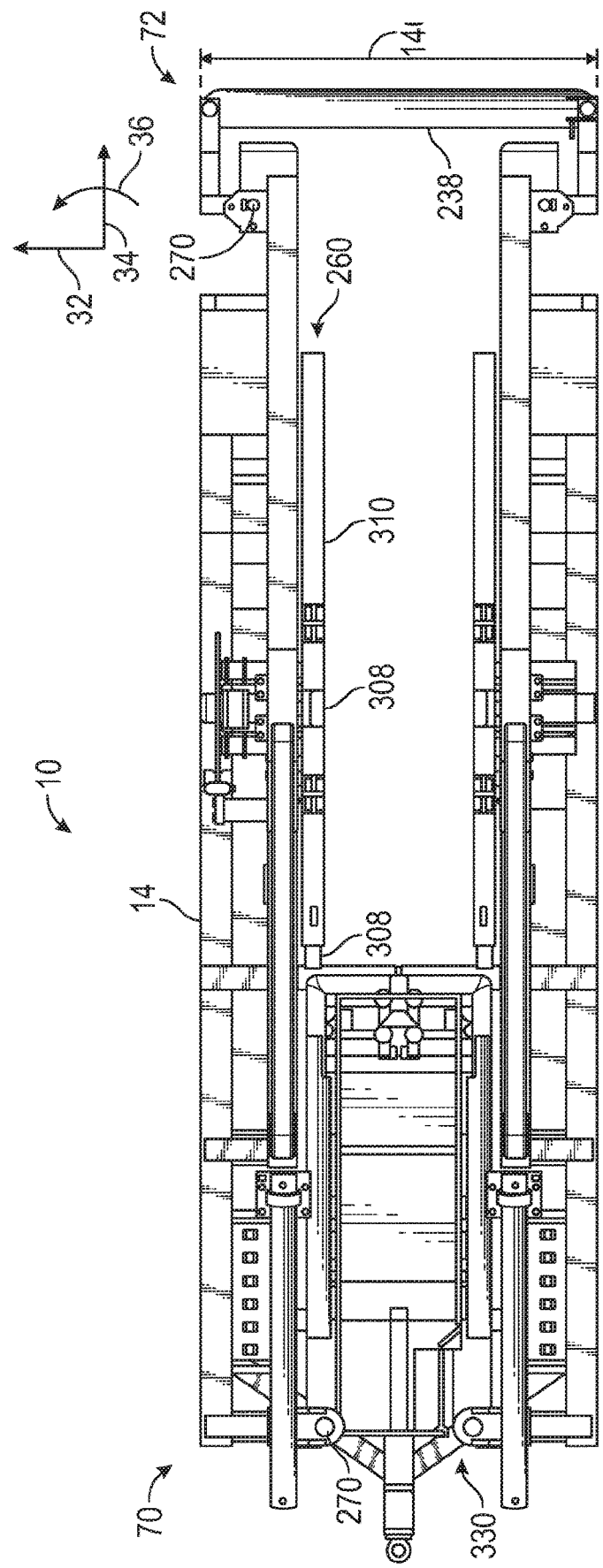
FIG. 23 is a top view an installation trailer according to embodiments of the present disclosure.

FIG. 23 is a top view of the embodiment of the installation trailer 10 shown in FIGS. 20-22. In the illustrated embodiment, the front section 330 is located retracted away from the front side 70 (e.g., toward the rear side 72) since the installation trailer 10 is in the collapsed configuration. Accordingly, the installation trailer 10 is shown with the collapsed system width 140. Other aspects of the installation trailer 10 are described above.

Figure 24:
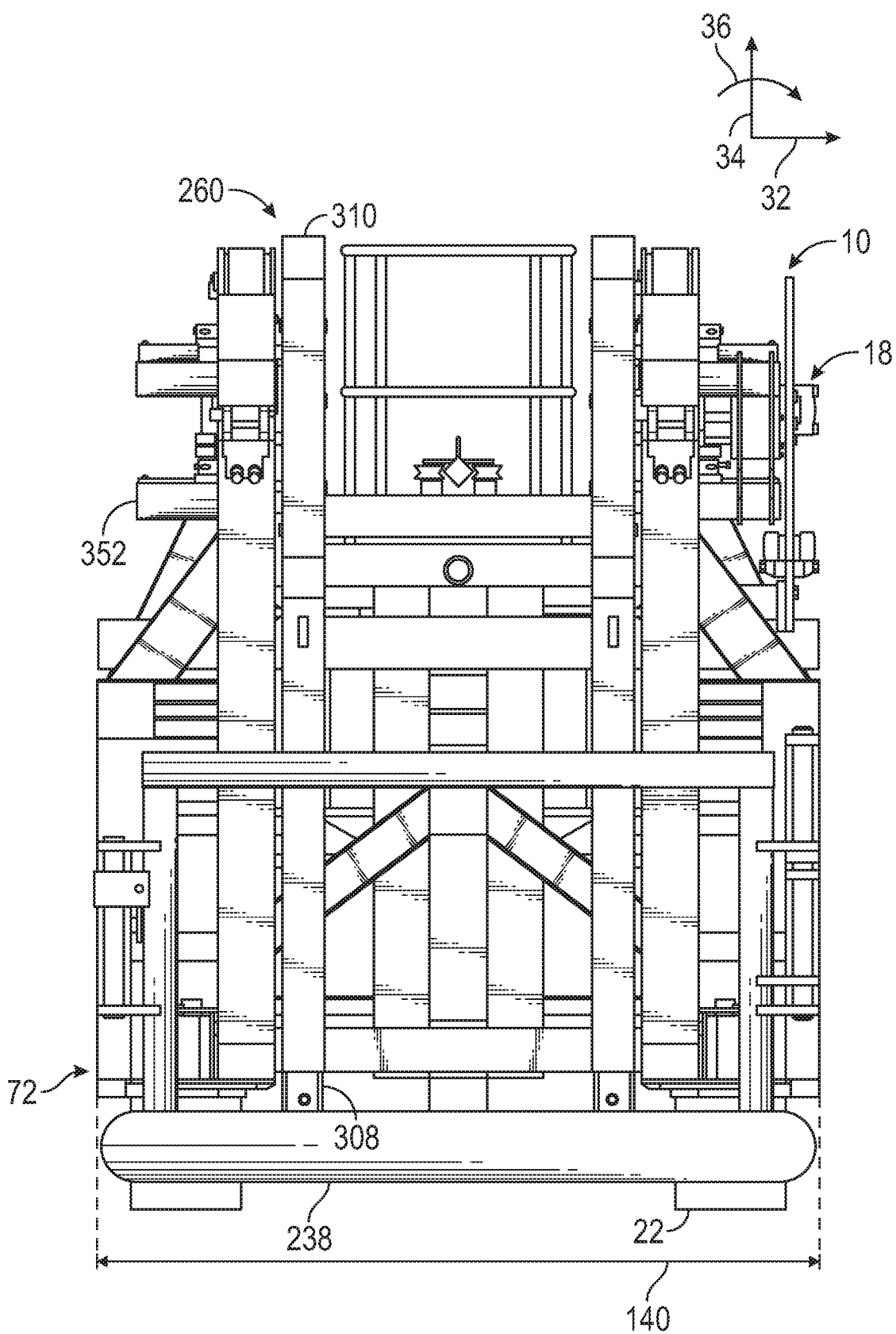
FIG. 24 is a rear view of an installation trailer according to embodiments of the present disclosure.

FIG. 24 illustrates a rear view of the embodiment of the installation trailer 10 shown in FIGS. 20-23. As shown in FIG. 24, the installation trailer 10 has the collapsed system width 140. Other aspects of the installation trailer 10 are described above.

Figure 25:
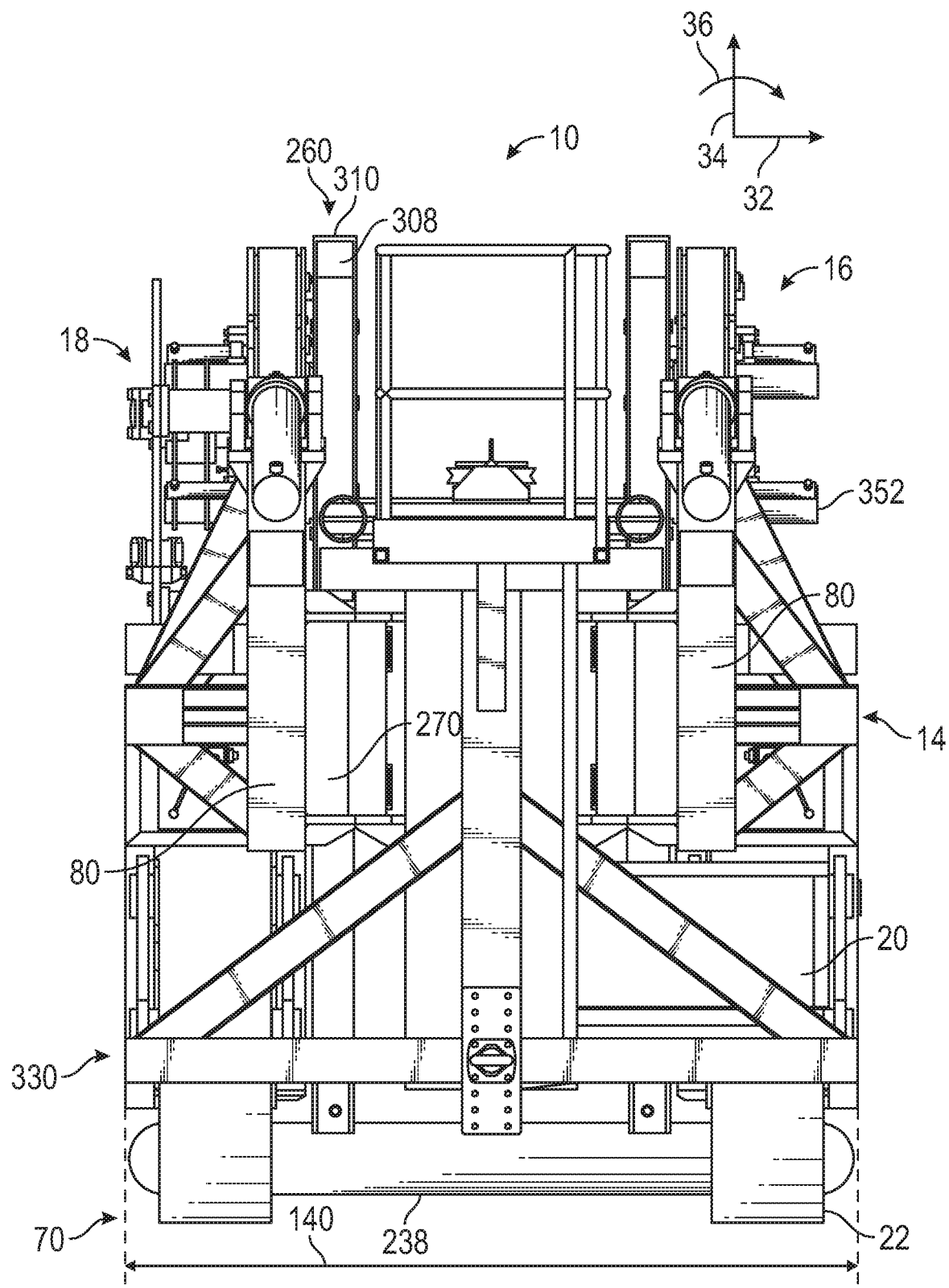
FIG. 25 is a front view of an installation trailer according to embodiments of the present disclosure.

FIG. 25 illustrates a front view of the embodiment of the installation trailer 10 shown in FIGS. 20-24. In the illustrated embodiment, the leaves 370 are approximately perpendicular with the axial axis 32, thereby enabling the installation trailer 10 to have collapsed system width 140. Other aspects of the installation trailer 10 are described above.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A system, comprising:
   a trailer frame;
   a lifting mechanism coupled to the trailer frame, wherein the lifting mechanism is configured to raise or lower a coil of pipe or a reel of pipe, and wherein the lifting mechanism includes an axle coupler that is configured to move along an inclined lifting beam;
   a braking mechanism configured to apply pressure to the pipe while the pipe is being deployed by the system; and
   a hydraulic power unit configured to hydraulically power the system.

2. The system of claim 1, wherein the lifting mechanism comprise a hydraulic cylinder.

3. The system of claim 1, wherein the braking mechanism comprises at least one of a beam pushed against the pipe, a caliper brake, a drum brake, or a hydraulic motor.

4. The system of claim 1, wherein the hydraulic power unit is disposed on a skid separate from the trailer frame.

5. The system of claim 1, wherein the trailer frame is configured to be collapsible such that at least one of a collapsed system width is less than an expanded system width, or a collapsed system length is less than an expanded system length, or a collapsed system height is less than an expanded system height.

6. The system of claim 5, wherein a portion of the collapsible trailer frame is configured to fold in or two portions of the collapsible trailer frame are configured to move toward one another.

7. The system of claim 1, comprising a coil containment device configured to block undesired movement of the coil of pipe.

8. The system of claim 7, wherein the coil containment device comprises at least one of a coil containment cage, a containment flange, or a truncated containment flange.

9. The system of claim 1, comprising wheels coupled to the trailer frame, wherein the wheels are configured to be pivotable.

10. The system of claim 1, comprising a re-rounding mechanism configured to re-round the deploying pipe.

11. The system of claim 1, comprising a gate coupled to the trailer frame, wherein the gate is configured to open to allow the coil of pipe or the reel of pipe to be coupled to the lifting mechanism.

12. The system of claim 1, comprising a band cutter configured to cut bands of the coil of pipe during deployment of the pipe.

13. A method, comprising:
providing a trailer comprising:
a trailer frame;
a lifting mechanism coupled to the trailer frame, wherein the lifting mechanism includes an axle coupler that is configured to move along an inclined lifting beam;
a braking mechanism; and
a hydraulic power unit configured to hydraulically power the trailer;
coupling a coil of pipe or a reel of pipe to the lifting mechanism;
adjusting a vertical position of the coil of pipe or the reel of pipe via the lifting mechanism;
deploying the pipe via rotation of the coil of pipe or the reel of pipe; and
applying pressure to the deploying pipe via the braking mechanism.

14. The method of claim 13, wherein adjusting the vertical position of the coil of pipe or the reel of pipe via the lifting mechanism comprises moving the coil of pipe or the reel of pipe at an angle with respect to the trailer frame.

15. The method of claim 13, comprising blocking undesired movement of the coil of pipe via a coil containment cage coupled to the trailer frame.

16. The method of claim 13, comprising blocking undesired movement of the coil of pipe via a pair of containment flanges coupled to the lifting mechanism and disposed on either side of the coil of pipe.

17. The method of claim 16, comprising adjusting a width between the pair of containment flanges.

18. The method of claim 13, comprising collapsing the trailer frame to reduce at least one of a width, a length, or a height of the trailer frame.

19. The method of claim 13, comprising supporting the coil of pipe via an expandable drum assembly and coupling the expandable drum assembly to the lifting mechanism.

20. The method of claim 13, wherein deploying the pipe comprises pulling the pipe from the trailer when the trailer is stationary or pulling the trailer.

* * * * *